(12) United States Patent
Han et al.

(10) Patent No.: US 10,544,050 B2
(45) Date of Patent: Jan. 28, 2020

(54) POSITIVE ELECTRODE ACTIVE MATERIAL FOR SODIUM-ION BATTERIES

(71) Applicant: FUNDACIÓN CENTRO DE INVESTIGACIÓN COOPERATIVA DE ENERGÍAS ALTERNATIVAS CIC, Miñano-Álava (ES)

(72) Inventors: Man Huon Han, Miñano-Álava (ES); Elena Gonzalo, Miñano-Álava (ES); Teófilo Rojo, Miñano-Álava (ES)

(73) Assignee: FUNDACIÓN CENTRO DE INVESTIGACIÓN COOPERATIVA DE ENERGÍAS ALTERNATIVAS CIC ENERGIGUNE FUNDAZIOA, Miñano-Álava (ES)

( * ) Notice: Subject to any disclaimer, the term of this patent is extended or adjusted under 35 U.S.C. 154(b) by 45 days.

(21) Appl. No.: 15/563,909

(22) PCT Filed: Mar. 31, 2016

(86) PCT No.: PCT/EP2016/056988
§ 371 (c)(1),
(2) Date: Oct. 2, 2017

(87) PCT Pub. No.: WO2016/156447
PCT Pub. Date: Oct. 6, 2016

(65) Prior Publication Data
US 2018/0123164 A1    May 3, 2018

(30) Foreign Application Priority Data

Apr. 1, 2015 (EP) ..................... 15382165

(51) Int. Cl.
*C01G 45/12* (2006.01)
*C01G 49/00* (2006.01)
(Continued)

(52) U.S. Cl.
CPC ..... *C01G 45/1228* (2013.01); *C01G 49/0027* (2013.01); *C01G 49/0072* (2013.01);
(Continued)

(58) Field of Classification Search
None
See application file for complete search history.

(56) References Cited

U.S. PATENT DOCUMENTS

2007/0218361 A1   9/2007  Inoue et al.
2010/0248040 A1   9/2010  Saito et al.
(Continued)

FOREIGN PATENT DOCUMENTS

CN    104617288 A    5/2015
EP    2 216 298 A1    8/2010
(Continued)

OTHER PUBLICATIONS

DERWENT English abstract for JP2012-206925 (Year: 2012).*
(Continued)

*Primary Examiner* — Sin J Lee
(74) *Attorney, Agent, or Firm* — Knobbe, Martens, Olson & Bear, LLP

(57) ABSTRACT

A positive electrode active material for a sodium-ion secondary battery contains a compound of formula $Na_xMn_{1-y-z}M_yM'_zO_2$ or its hydrate. A cathode can contain the active material and rechargeable sodium-ion battery can contain such a cathode.

14 Claims, 24 Drawing Sheets

(51) Int. Cl.
| | |
|---|---|
| C01G 53/00 | (2006.01) |
| H01M 4/525 | (2010.01) |
| H01M 4/505 | (2010.01) |
| H01M 4/02 | (2006.01) |
| H01M 4/131 | (2010.01) |
| H01M 10/054 | (2010.01) |

(52) U.S. Cl.
CPC .............. *C01G 53/50* (2013.01); *H01M 4/02* (2013.01); *H01M 4/131* (2013.01); *H01M 4/505* (2013.01); *H01M 4/525* (2013.01); *H01M 10/054* (2013.01); *C01P 2002/72* (2013.01); *C01P 2002/76* (2013.01); *C01P 2002/77* (2013.01); *C01P 2004/03* (2013.01); *C01P 2006/40* (2013.01); *H01M 2004/028* (2013.01)

(56) References Cited

U.S. PATENT DOCUMENTS

| | | |
|---|---|---|
| 2011/0200879 A1 | 8/2011 | Saito et al. |
| 2015/0333363 A1 | 11/2015 | Hojo |
| 2016/0211516 A1* | 7/2016 | Hu et al. ............... H01M 4/505 |

FOREIGN PATENT DOCUMENTS

| | | |
|---|---|---|
| JP | 2012-206925 A | 10/2012 |
| JP | 2014-160653 A | 9/2014 |
| WO | WO 2014/091687 A1 | 6/2014 |
| WO | WO 2014/122566 A1 | 8/2014 |
| WO | WO 2014/132174 A1 | 9/2014 |

OTHER PUBLICATIONS

Machine-assisted English translation of JP2012-206925 (Year: 2012).*
Buchholz, D. et al., Toward Na-ion Batteries-Synthesis and Characterization of a Novel High Capacity Na Ion Intercalation Material, Chemistry of Materials, vol. 25, No. 2, pp. 142-148, Jan. 22, 2013.
Han. M.H., et al., High-Performance P2-Phase Na 2/3 Mn 0.8 Fe 0.1 Ti 0.1 O 2 Cathode Material for Ambient-Temperature Sodium-Ion Batteries, Chemistry of Materials, vol. 28, No. 1, pp. 106-116, Nov. 25, 2015.
Li, Y., et al., Air-Stable Copper-Based P2-Na 7/9 Cu 2/9 Fe 1/9 Mn 2/3 O 2 as a New Positive Electrode Material for Sodium-Ion Batteries, Advanced Science, vol. 2, No. 6, May 4, 2015.
International Search Report, dated May 18, 2016 in International Application No. PCT/EP2016/056988.
Bilaud, J., et al., $Na_{0.67}Mn_{1-x}Mg_xO_2(0≤x≤0.2)$: a High Capacity Cathode for Sodium-Ion Batteries, Energy & Environmental Science, vol. 7, pp. 1387-1391, 2014.
Buchholz, D., et al., Toward Na-Ion Batteries-Synthesis and Characterization of a Novel High Capacity Na Ion Intercalation Material, Chemistry of Materials, vol. 25, pp. 142-148, 2013.
Caballero, A., et al., Synthesis and Characterization of High-Temperature Hexagonal P2-$Na_{0.6}MnO_2$ and its Electrochemical Behaviour as Cathode in Sodium Cells, Journal of Materials Chemistry, vol. 12, pp. 1142-1147, 2002.
Han, M.H., et al., A comprehensive review of sodium layered oxides: powerful cathodes for Na-ion batteries, Energy & Environmental Science, vol. 8, pp. 81-102, 2015.
Han, M.H., et al., High-Performance P2-Phase $Na_{2/3}Mn_{0.8}Fe_{0.1}Ti_{0.1}O_2$ Cathode Material for Ambient-Temperature Sodium-Ion Batteries, Chemistry of Materials, vol. 28, pp. 106-116, 2015.
Li, Y., et al., Air-Stable Copper-Based P2-$Na_{7/9}Cu_{2/9}Fe_{1/9}Mn_{2/3}O_2$ as a New Positive Electrode Material for Sodium-Ion Batteries, Advanced Science, vol. 2, 1500031, 7 pages, 2015.
Ma, X., et al., Electrochemical Properties of Monoclinic $NaMnO_2$, Journal of the Electrochemical Society, vol. 158, No. 12, pp. A1307-A1312, 2011.
Mendiboure, A., et al., Electrochemical Intercalation and Deintercalation of $Na_xMnO_2$ Bronzes, Journal of Solid State Chemistry, vol. 57, pp. 323-331, 1985.
Mortemard De Boisse, B., et al., Structural and Electrochemical Characterizations of P2 and New O3-$Na_xMn_{1-y}Fe_yO_2$ Phases Prepared by Auto-Combustion Synthesis for Na-Ion Batteries, Journal of the Electrochemical Society, vol. 160, No. 4, pp. A569-A574, 2013.
Palomares, V., et al., Update on Na-based Battery Materials. A growing Research Path, Energy & Environmental Science, vol. 6, pp. 2312-2337, 2013.
Su, D., et al., Single Crystalline $Na_{0.7}MnO_2$ Nanoplates as Cathode Materials for Sodium-Ion Batteries with Enhanced Performance, Chemistry—A European Journal, vol. 19, No. 33, pp. 10884-10889, 2013.
Wang, H., et al., Electrochemical Properties of P2-$Na_{2/3}[Ni_{1/3}Mn_{2/3}]O_2$ Cathode Material for Sodium Ion Batteries When Cycled in Different Voltage Range, Electrochimica Acta, vol. 113, pp. 200-204, 2013.
Yabuuchi, N., et al., P2-Type $Na_x[Fe_{1/2}Mn_{1/2}]O_2$ Made From Earth-Abundant Elements for Rechargeable Na Batteries, Nature Materials, vol. 11, pp. 512-517, 2012.
Yabuuchi, N., et al., A New Electrode Material for Rechargeable Sodium Batteries: P2-Type $Na_{2/3}[Mg_{1.28}Mn_{0.72}]O_2$ With High Reversible Capacity, Journal of Materials Chemistry A, vol. 2, pp. 16851-16855, 2014.
Yoshida, H., et al., P2-Type $Na_{2/3}Ni_{1/3}Mn_{2/3-x}Ti_xO_2$ as a New Positive Electrode for Higher Energy Na-Ion Batteries, Chemical Communications, vol. 50, pp. 3677-3680, 2014.
Dollé, Mickaël et al., Layered Manganese Oxide Intergrowth Electrodes for Rechargeable Lithium Batteries. 1. Substitution with Co or Ni, Chem. Mater., vol. 17, pp. 1036-1043, 2005.
Eriksson, Tom A., et al., Influence of Substitution on the Structure and Electrochemistry of Layered Manganese Oxides, Chem. Mater., vol. 15, pp. 4456-4463, 2003.
Communication pursuant to Article 94(3) EPC, dated Aug. 28, 2019, in European Application No. 16712357.9.
Notice of Reasons for Rejection, dated Oct. 1, 2019, in Japanese Patent Application No. 2017-551691.

* cited by examiner (a)

(b)

(a)

(b)

(a)

(b)

POSITIVE ELECTRODE ACTIVE MATERIAL FOR SODIUM-ION BATTERIES

PRIORITY AND CROSS REFERENCE TO RALTED APPLICATIONS

This application is the U.S. National Phase Application under 35 U.S.C. § 371 of International Application No. PCT/EP2016/056988, filed Mar. 31, 2016, designating the U.S. and published in English as WO 2016/156447 A1 on Oct. 6, 2016, which claims the benefit of European Patent Application No. EP 15382165.7, filed Apr. 1, 2015. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

The present invention relates to sodium-containing transition metal oxides with Mn-rich phase for its use as cathode materials for a rechargeable sodium battery and other energy storage devices.

BACKGROUND

The commercialization of Li-ion battery (LIB) during the last decades has been a major success in secondary battery industry, which made it possible to implement small electronic gadgets into daily life. However, expending the use of Li-ion based battery to larger applications such as electricity storage grid support may be hindered due to the geographical isolation and availability of Li sources.

In this regard, Na-ion battery (NIB) is vastly considered as an excellent alternative to LIB for stationary applications because Na is one of the most abundant elements in earth curst and seawater, and it is also the second lightest alkali metal next to Li. In fact, Na intercalation chemistry of some cathode materials for NIB has been demonstrated during 1980's and recent research progress in electrode materials has shown the feasibility of cost effective fully functional unit that can be implemented into real applications in near future [Palomares, V., Energ. Environ. Sci., 2013, 6, 2312]. It is widely postulated that the energy density of NIB cathode materials may not be able to match that of LIB because Na is more than three times heavier and the average operating voltage is lower than that of Li hosting counterparts. However, despite such postulation, NIB has become an attractive system due to the cost and durability for a long term operation, technical features considered to be more important than the energy density of each unit for large stationary applications.

Among many cathode candidates, layered oxides $Na_x$-$M_TO_2$ ($M_T$=Ti, V, Cr, Mn, Fe, Co, Ni and combination of two or more thereof) are of great interest because of their large specific capacity, ease of synthesis, and choice of several metal constituents [Han, M. H. et al., Energ. Environ. Sci., 2015, 8, 81].

As an example, P2-phase $Na_xMnO_2$ systems have been tested as positive electrodes [Mendiboure, A., et al., J. Solid State Chem., 1985, 57, 323; Caballero, A. et al., J. Mater. Chem., 2002, 12, 1142; Ma, X. et al., J. Electrochem. Soc., 2011, 158, A1307; Su, D. et al., Chem. Eur. J., 2013, 19, 10884]. However, although the electrode delivers a high specific capacity, the charge/discharge profile exhibits multiple plateaus which implies structural instability during the cycling, and, additionally, a rapid capacity fades is also observed, particularly over 7% capacity is faded during only 10 cycles.

α-$NaFeO_2$ exhibits high, flat voltage profile during the cycling but undergoes an irreversible structural change above approximately 3.6 V which causes a rapid capacity degradation after only a few cycles [Yabuuchi, N. et al., J. Mater. Chem., A, 2014, 40, 16851-16855].

Furthermore, a series of Fe and Mn containing layer oxides have been investigated extensively due to the environmental benignity, inexpensive metal constituents, and large reversible capacity. For example, a cathode material having a layer of $Na_xFe_{1/2}Mn_{1/2}O_2$ has been disclosed [Yabuuchi, N. et al., Nat. Mater., 2012, 11, 512]. This cathode material does not contain scarce or toxic elements and it showed high reversible capacity in Na-ion batteries. The Fe—Mn-oxide host structure remains intact during sodium de-intercalation and re-insertion. Nevertheless, the cooperative effect of large substitution of transition metals into Mn containing layered oxides has been demonstrated either to attain structural stability at an expense of specific capacity or to have a large specific capacity at an expense of structural stability.

Recently, small substitution of electrochemically inactive element, such as Co and Mg, into Mn-rich P2-phase compound has also been described [WO2014/132174; Billaud, J. et al., Energy Environ. Sci., 2014, 7, 1387-1391 Yabuuchi, N. et al., J. Mater. Chem., A, 2014, 40, 16851-16855]. However, an appropriate balance between specific capacity and cycling performance cannot be achieved and, thus, it still remains as an obstacle for these materials to be used as cathode in Na-ion batteries. In particular, small substitution of Co (~10%) delivers a specific capacity over 150 mAh/g, but the capacity fades down to 100 mAh/g only after 30 or less cycles. A small substitution of Mg (~20%) delivers ~150 mAh/g and a capacity retention of 95% but only for 25 cycles.

Other documents of the prior art describes sodium-ion secondary batteries comprising a positive electrode active material which includes sodium and lithium $Na_aLi_bM_xO_2$, wherein M is Mn, Fe, Co, Ni or a combination of two of them [US2007/0218361; US2010/0248040 and US2011/0200879].

Another class of known sodium intercalation cathode materials are phosphates like $NaMn_{0.5}Fe_{0.5}PO_4$, or fluorite-phosphates like $NaVPO_4F$ or $Na_2FePO_4F$. However, both phosphates and fluorophosphates exhibit certain difficulties in their chemical preparation and have a low gravimetric capacity and their use in Na-ion batteries is quite limited.

In spite of the different cathode materials described in the prior art, there is still much interest in developing new cathode materials having a good balance of properties, in particular, a considerably improved reversible capacity as well as a higher cycle stability so as the electrode can be recharged multiple times without significant loss in charge capacity. Furthermore, it is also desirable for such materials to be straightforward to manufacture at low cost and easy to handle and store.

SUMMARY

The authors of the present invention have developed a sodium-containing layer oxide with Mn-rich phase to be used as a cathode material for Na-ion batteries. This particular material has shown to be stable, even against water, and has a long term performance as well as a high rate capability.

Particularly, and according to the results provided in the experimental part, the material of the invention delivers at C/10 a specific capacity around 145 mAh/g, and also exhibits stable cycling by maintaining more than 98% of discharge capacity for 50 cycles and more than 87% of discharge capacity for 300 cycles.

Thus, a first aspect of the present invention refers to a positive electrode active material for a sodium-ion secondary battery, said positive electrode active material comprising a compound of formula (I):

$$Na_xMn_{1-y-z}M_yM'_zO_2 \qquad (I)$$

or a hydrated form thereof,
wherein:
M is one or more elements selected from Ti, V, Cr, Zr, Al and Cu; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$, Al is $Al^{3+}$ and Cu is $Cu^{2+}$.
M' is one or more elements selected from Fe, Ni and Zn; wherein Fe is selected from $Fe^{2+}$ and $Fe^{3+}$; Ni is $Ni^{3+}$ and Zn is $Zn^{2+}$;
the oxidation state of Mn ranges from $3^+$ to $4^+$;
$0.6 < x \le 1.0$;
$0 < y \le 0.4$;
$0.05 \le z < 0.2$;
provided that:
$0.05 < (y+z) \le 0.4$.

Comparing to other materials having larger substitutions of various transition metals into Mn containing layered oxides, which have demonstrated either to attain structural stability at an expense of specific capacity or to have a high specific capacity at an expense of structural stability, the positive electrode active material of the present invention attains vastly improved structural stability while retaining high specific capacity at low level of substitution, which illustrates the possibility of full utilization of maximum energy density with long term stability for layered oxide Na-ion battery cathode.

A second aspect of the present invention refers to a cathode for a rechargeable sodium-ion secondary battery, said cathode comprises the positive electrode active material as defined above.

An additional aspect of the invention relates to a rechargeable sodium-ion secondary battery comprising the cathode as defined above.

Finally, another aspect of the present inventions relates to the use of the rechargeable sodium-ion battery as defined above as energy storage device.

DETAILED DESCRIPTION OF THE INVENTION

Figure 1:
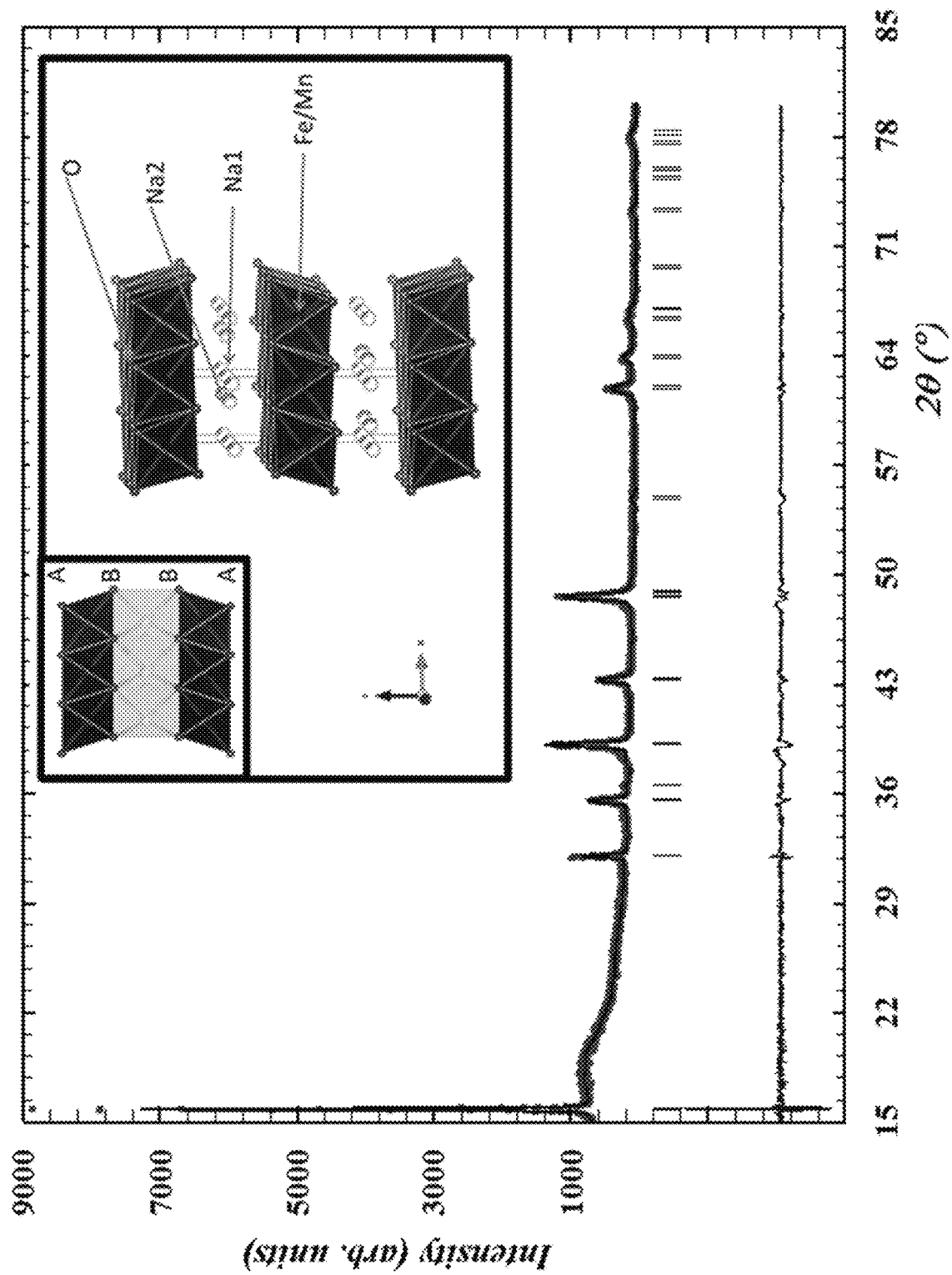
FIG. 1. XRD pattern matching of pristine $Na_{2/3}Mn_{0.8}Ti_{0.1}Fe_{0.1}O_2$ powder with hexagonal P6$_3$/mmc symmetry. Inset is a structural illustration of typical P2-phase layered oxide.
Figure 2A:
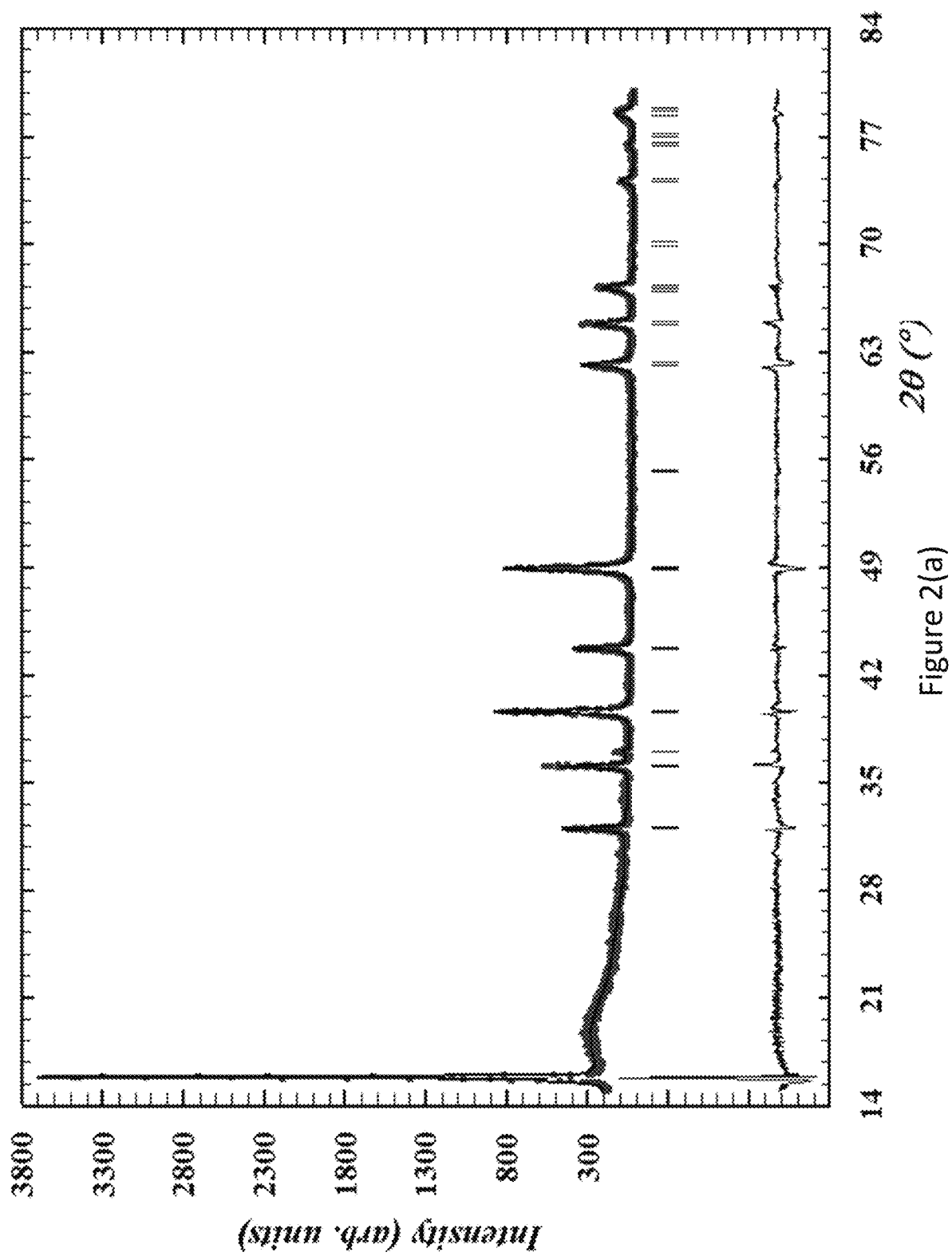
FIG. 2. XRD patterns of P2—(a) $Na_{2/3}Mn_{0.8}Zn_{0.1}Al_{0.1}O_2$ (b) $Na_{2/3}Mn_{0.8}Zn_{0.1}Cu_{0.1}O_2$; (c) $Na_{2/3}Mn_{0.8}Zn_{0.1}Ti_{0.1}O_2$; (d) $Na_{2/3}Mn_{0.8}Fe_{0.1}Cu_{0.1}O_2$; (e) $Na_{2/3}Mn_{0.8}Fe_{0.1}Al_{0.1}O_2$; (f) $Na_{2/3}Mn_{0.9}Fe_{0.05}Ti_{0.05}O_2$ powder: experimental pattern (dotted curve), refined profile (continuous line), and Bragg positions (vertical bars).
Figure 2B:
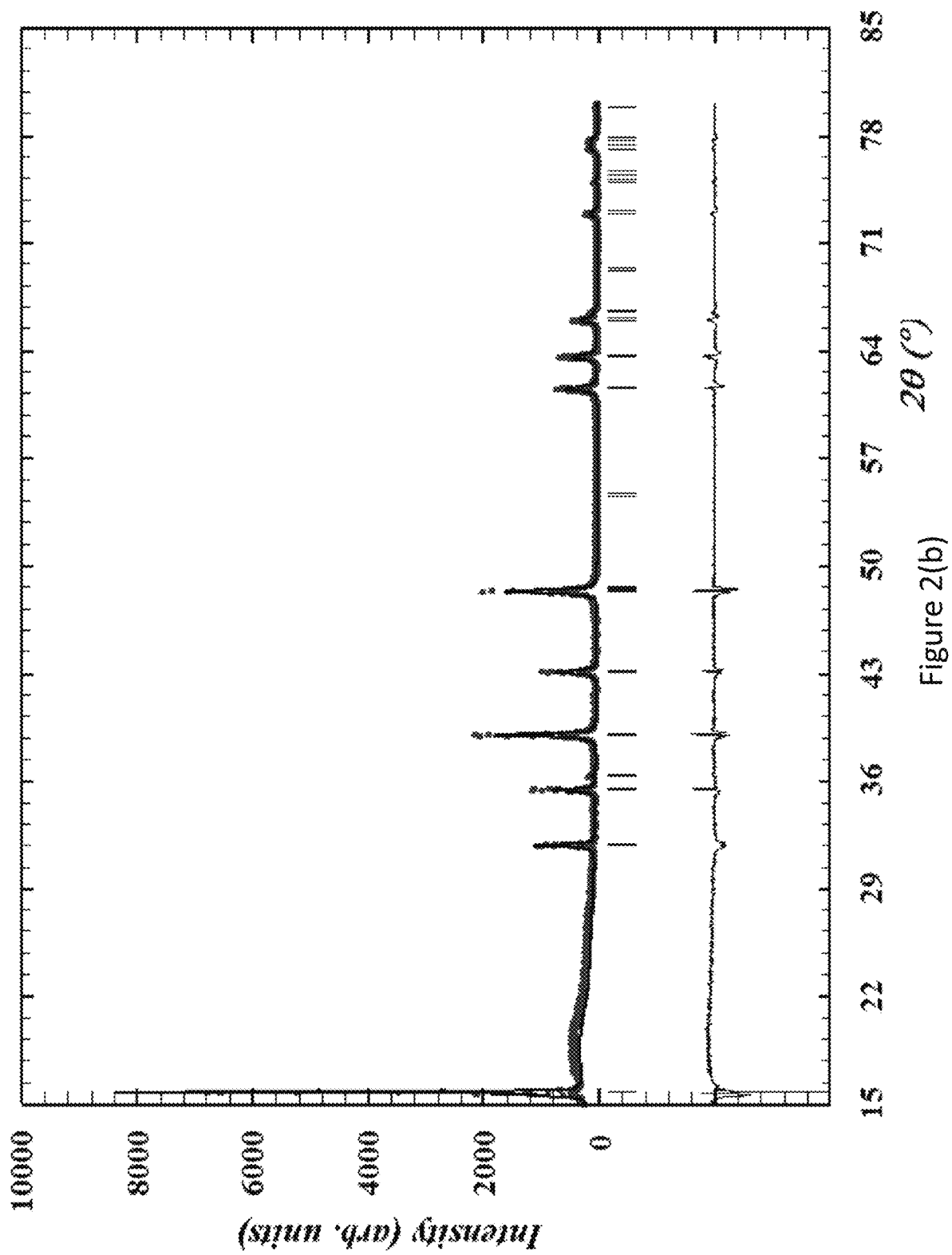
Figure 2C:
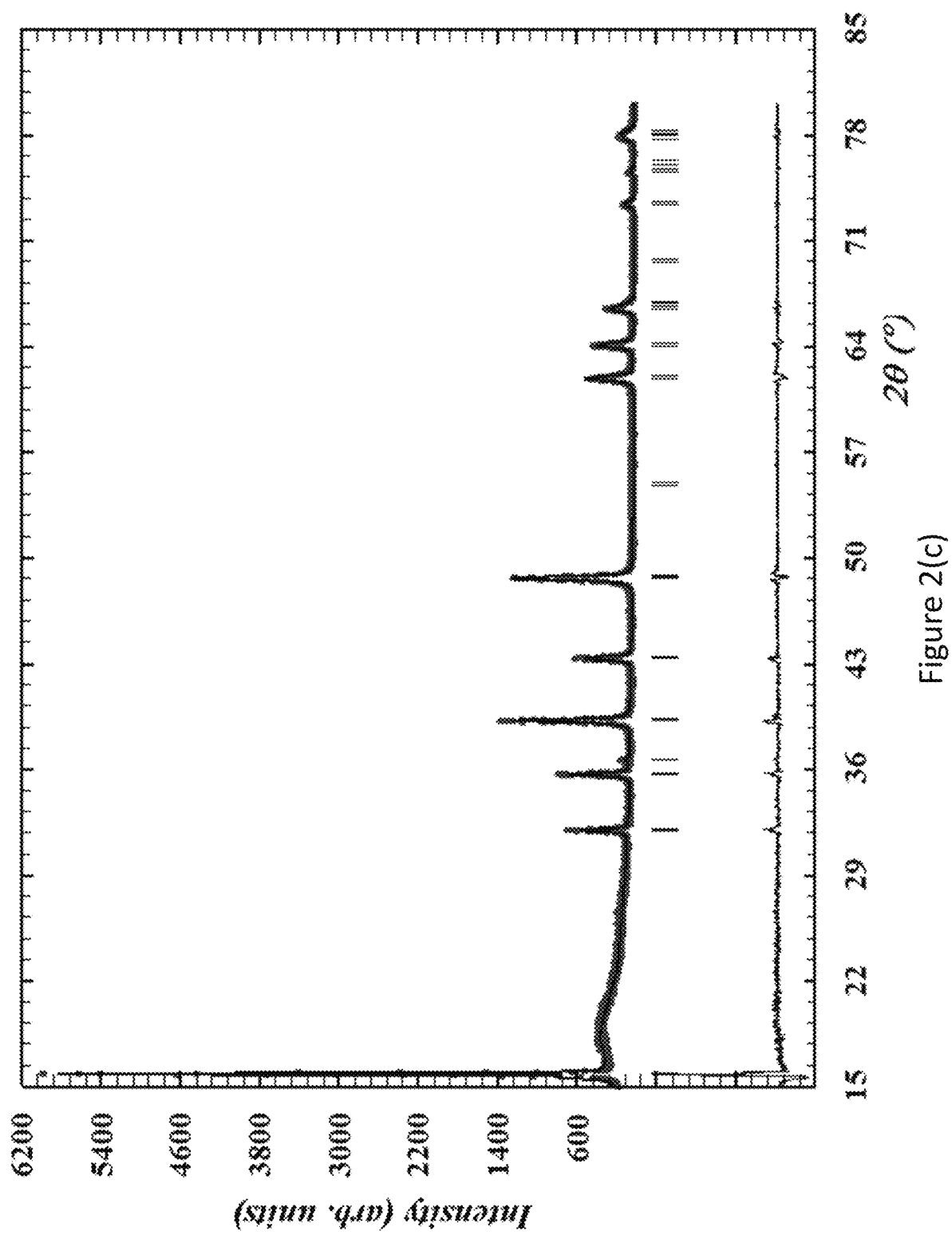
Figure 2D:
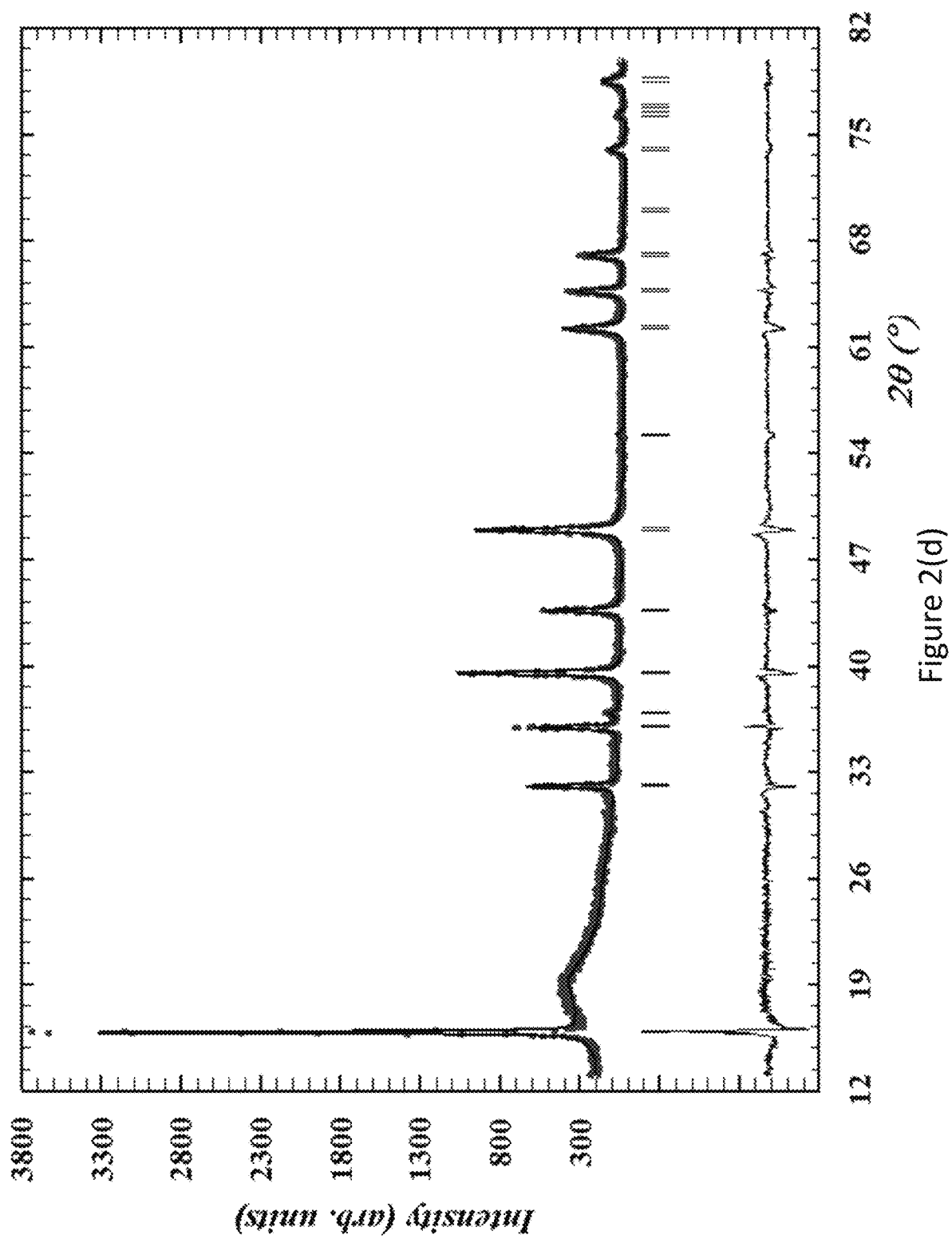
Figure 2E:
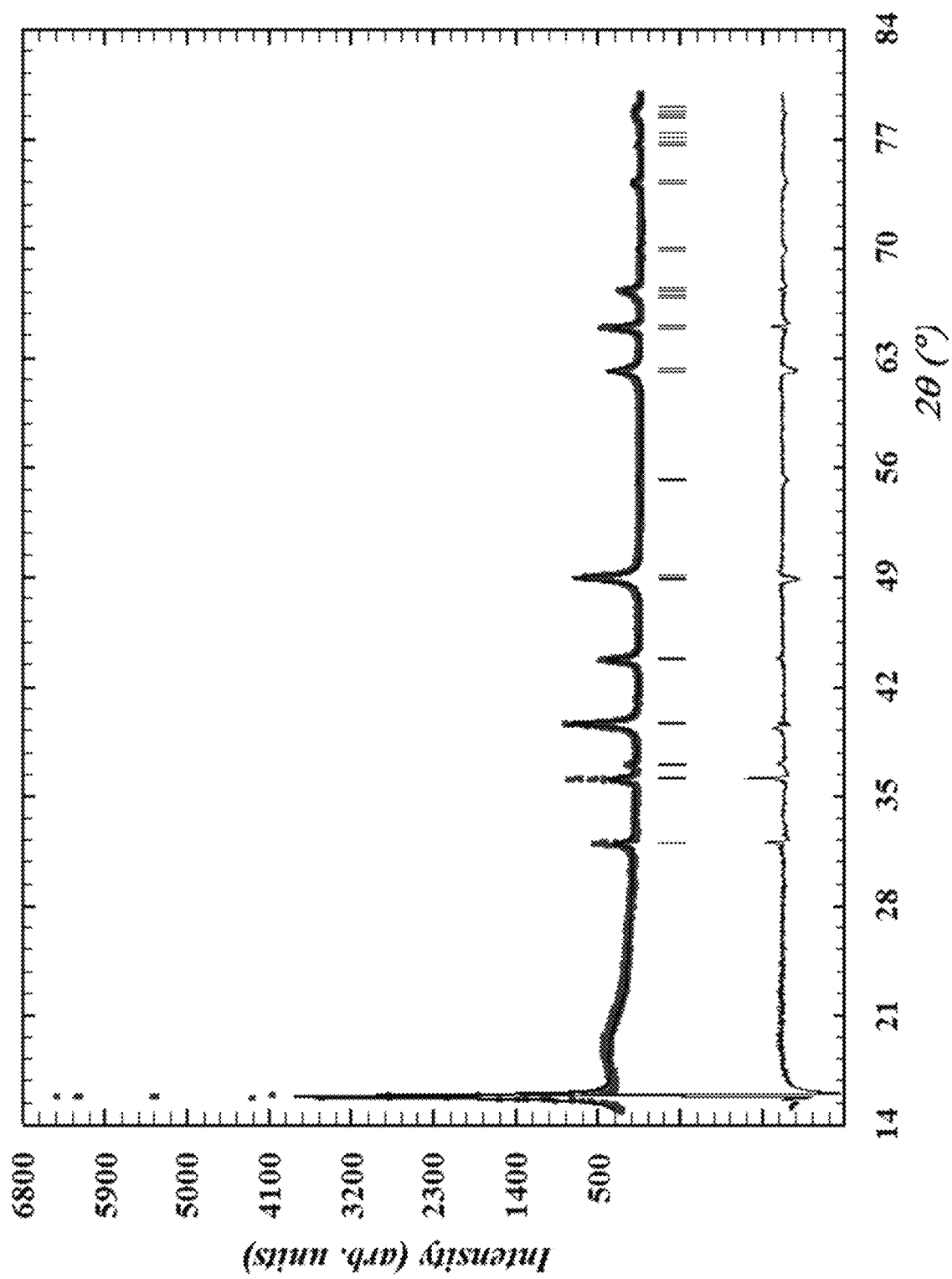
Figure 2F:
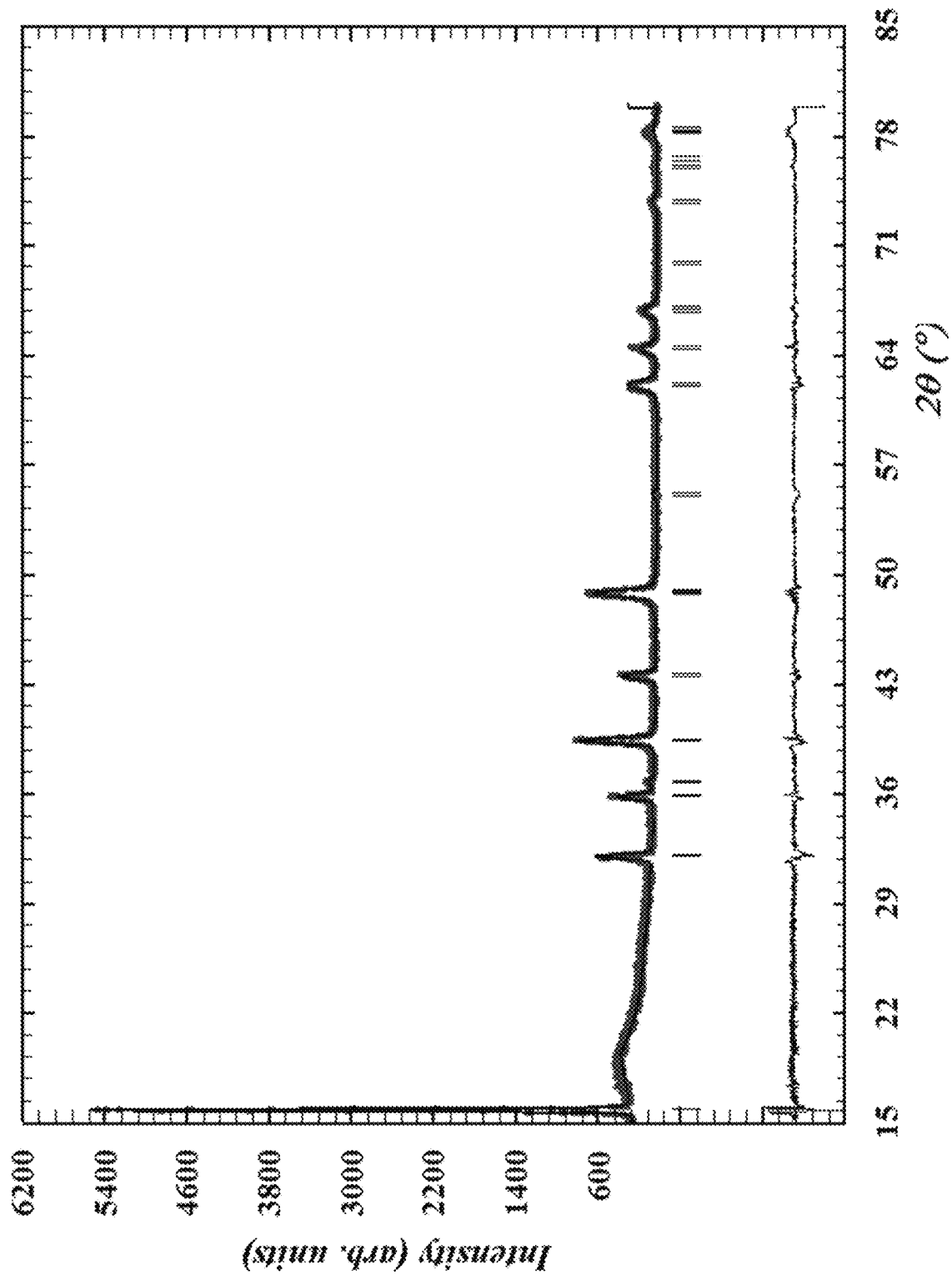

As stated above, the first aspect of the present invention refers to a positive electrode active material for a sodium-ion secondary battery, said positive electrode active material comprising a compound of formula (I):

$$Na_xMn_{1-y-z}M_yM'_zO_2 \qquad (I)$$

or a hydrated form thereof,
wherein:
M is one or more elements selected from Ti, V, Cr, Zr, Al and Cu; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$, Al is $Al^{3+}$ and Cu is $Cu^{2+}$.
M' is one or more elements selected from Fe, Ni and Zn; wherein Fe is selected from $Fe^{2+}$ and $Fe^{3+}$; Ni is $Ni^{3+}$ and Zn is $Zn^{2+}$;
the oxidation state of Mn ranges from $3^+$ to $4^+$;
$0.6 < x \le 1.0$;
$0 < y \le 0.4$;
$0.05 \le z < 0.2$;
provided that:
$0.05 < (y+z) \le 0.4$.

The compound of formula (I) comprised in the positive electrode active material of the present invention present a crystal structure which belongs to the so-called "bronze phases". There are different crystal phases for sodium transition metal oxides depending on exact sodium to metal stoichiometry and preparation conditions.

In a particular embodiment, the compound of formula (I) presents a layer bronze phase selected from P2, P3 and O$_3$.

The P2, P3, O3 nomenclature is a simple way to classify layered bronze phases. The letter stands for the sodium environment (P for prismatic, O for octahedral) and the number stands for the number of metal layers within the prismatic or octahedral unit cell. Another way to describe the P2 and O3 phases is to refer to the oxygen positions within a hexagonal stacking. The oxygen stacking in P2 is ABBAAB with metal located on c and sodium partially located on prismatic sites x=(a,b) and y=(b,c), resulting in a stacking sequence (AcB x BcA y AcB . . . ). In the O3-phase the stacking is ABCABC . . . .

In a preferred embodiment of the present invention, the compound of formula (I) is single phase and has a P2 or O3 crystal structure, also known as pristine P2- or O3 layered crystal structure.

In a particular embodiment, in the compound of formula (I) the sum of indexes (y+z) is defined as 0.05<(y+z)≤0.2.

In a particular embodiment, in the compound of formula (I), the index "y" is defined as 0.05≤y≤0.2. Preferably the index "y" is defined as 0.05≤y≤0.1, more preferably the index "y" is 0.1 or 0.05, even more preferably is 0.1.

In another particular embodiment, in the compound of formula (I), the index "z" is defined as 0.05≤z≤0.1, provided that 0.05<(y+z)≤0.4. Preferably the index "z" is 0.1 or 0.05, even more preferably is 0.1.

In another particular embodiment, the index "y" is defined as 0.05≤y≤0.1 and the index "z" is defined as 0.05≤y≤0.1. In another preferred embodiment "y" is 0.1 and "z" is 0.1 or "y" is 0.05 and "z" is 0.05.

In another particular embodiment, M is selected from Ti, Al and Cu, wherein Ti is selected from $Ti^{3+}$ and $Ti^{4+}$, Al is $Al^{3+}$ and Cu is $Cu^{2+}$. Preferably, M is Ti, wherein Ti is selected from $Ti^{3+}$ and $Ti_{4+}$.

In another particular embodiment, M' is selected from Fe and Zn, wherein Fe is selected from $Fe^{2+}$ and $Fe^{3+}$ and Zn is $Zn^{2+}$. Preferably, M' is Fe, wherein Fe is $Fe^{2+}$ or $Fe^{3+}$.

In a preferred embodiment, M is Ti and M' is Fe, wherein Ti is selected from $Ti^{3+}$ and $Ti^{4+}$ and Fe is selected from $Fe^{2+}$ and $Fe^{3+}$.

In another particular embodiment, the compound of formula (I) is selected from $Na_{2/3}Mn_{0.8}Ti_{0.1}Fe_{0.1}O_2$, $Na_{2/3}Mn_{0.8}Cu_{0.1}Fe_{0.1}O_2$; $Na_{2/3}Mn_{0.8}Al_{0.1}Fe_{0.1}O_2$; $Na_{2/3}Mn_{0.8}Ti_{0.1}Zn_{0.1}O_2$; $Na_{2/3}Mn_{0.8}Cu_{0.1}Zn_{0.1}O_2$; $Na_{2/3}Mn_{0.8}Al_{0.1}Zn_{0.1}O_2$ and $Na_{2/3}Mn_{0.9}Ti_{0.05}Fe_{0.05}O_2$, preferably is $Na_{2/3}Mn_{0.8}Ti_{0.1}Fe_{0.1}O_2$ or $Na_{2/3}Mn_{0.9}Ti_{0.05}Fe_{0.05}O_2$, even more preferably is $Na_{2/3}Mn_{0.8}Ti_{0.1}Fe_{0.1}O_2$.

In a particular embodiment, the compound of formula (I) is in a hydrated form. By the term "hydrated form" should be understood the compound of formula (I) having $H_2O$ molecules and/or $H^+$ co-intercalated between the layers of its crystal structure. For example, when the compound of formula (I) has a pristine P2-layer crystal structure, the hydrated form corresponds to the compound of formula (I) having $H_2O$ molecules and/or $H^+$ inserted into the spacing between the layers of the pristine crystal structure.

In a particular embodiment, the hydrated form of the compound of formula (I) can be represented as follows:

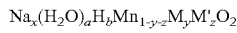

wherein:
M, M', x, y and z are as defined above,
0≤a≤0.1 and 0≤b≤0.2
and wherein $H_2O$ and $H^+$ are co-intercalated between the layers of the crystal structure of the compound of formula (I).

The compound of formula (I) may be prepared by many different processes known for those skilled in the art. For example, the process may be a simple solid state reaction using a sodium precursor (typically $Na_2CO_3$), a manganese precursor ($Mn_2O_3$, $MnO_2$, $MnCO_3$, $MnOOH$, etc.) and precursors of transition metals Ti, V, Cr, Fe, Ni, Zr, Al, Cu and Zn (transition metal oxides such as $Fe_2O_3$, FeO, $TiO_2$, $ZrO_2$, ZnO, CuO, $Al_2O_3$, etc.). The corresponding amounts of the Na, Mn and transition metals precursors are mixed and then heated in a tube furnace or a chamber furnace using either a flowing inert atmosphere (e.g., argon or nitrogen) or an ambient air atmosphere until reaction product is formed. The sintering temperature should be high enough to allow a complete reaction and formation of crystals, but not too high to avoid excessive sintering. In a preferred embodiment, the sintering temperature ranges from 400 to 1200° C., more preferably from 700 to 1000° C.

In a particular embodiment, the mixture of the different precursors is subjected to a freeze step as a previous step of sintering. In this particular case, the mixture can be frozen by directly pouring liquid nitrogen into the mixing container and then dried in a freeze drier prior to be subjected to the sintering step.

For the synthesis of the hydrated form of the compound of formula (I), this compound in its powder form can be simply dispersed in water, filtered and washed with water.

In a particular embodiment, the compound of formula (I) delivered a second charge/discharge capacity of 146.57/144.16 mAh/g within the voltage range 4.0-2.0 V at C/10 which implies the utilization of approximately 0.60 Na considering full capacity of 245.19 mAh/g. The average voltage and energy density of the compound of formula (I) are calculated to be 2.77 V and 399.32 mWh/g vs. Na, respectively.

In another particular embodiment, the hydrated compound of formula (I) delivered a second charge/discharge capacity of 130.40/129.22 mAh/g, which slightly increases to reach the maximum over 134 mAh/g. Slight increase in reversible capacity during the first cycles is probably due to redistribution and stabilization of $Na^+$ and $H^+$ in the interlayer spacing.

In another particular embodiment, the compound of formula (I) exhibits an excellent capacity retention by maintaining 95.09% of discharge capacity at $50^{th}$ cycle comparing to second cycle (only 0.1% capacity degradation on each cycle) along with over 98% Coulombic efficiency which points out the improved electrochemical properties of the active material of the invention.

In another particular embodiment, the hydrated compound of formula (I) exhibits even better performance by retaining over 99% of reversible capacity after initial increase in specific capacity.

In another particular embodiment, the compound of formula (I) exhibits a remarkable rate capability by maintaining 99.40 mAh/g discharge capacity at 1C which is 68.95% of C/10, and such high rate capability indicates a fast de/intercalation kinetic of pristine electrode.

In a further embodiment, the compound of formula (I) exhibits an exceptional stability by maintaining 87.17 mAh/g at $300^{th}$ cycle, which means 87.70% capacity retention from the second cycle (0.041% capacity degradation on each cycle). Furthermore, Coulombic efficiency is near 100% for all cycles, while the polarization (18.93-8.18 mV) is almost identical to that of C/10.

The electrochemical process is based on $Mn^{3+}/Mn^{4+}$ redox process because the transition metals represented by M are inactive at the tested voltage range. During the discharge process, the Mn should be reduced to 3+ oxidation state, whereas the concentration of $Mn^{4+}$ increases during the charge process.

Comparing to compounds having larger substitutions of various transition metals into Mn containing layered oxides which have demonstrated either to attain structural stability at an expense of specific capacity or to have a high specific capacity at an expense of structural stability, the active material used in the present invention attains vastly improved structural stability while retaining high specific capacity at low level of substitution, which illustrates the possibility of full utilization of maximum energy density with long term stability for layered oxide Na-ion battery cathode.

Thus, the positive electrode active material of the present invention can be applied to a cathode of a Na-ion battery. Thus, the invention also refers to a cathode for a Na-ion battery comprising the positive electrode active material as defined above.

A typical cathode comprises a current collector which can be made of an aluminum or copper foil covered by a film containing the positive electrode active material. In a particular embodiment, said film also comprises a conductive additive and a binder.

Examples of conductive additives include carbon black or acetylene black. The addition of a conductive additive provides an excellent charge and discharge cycle characteristics and a high energy density can be obtained.

The content of the conductive additive in the cathode is preferably not higher than 40 mass % and not lower to 5 mass % of cathode in order to achieve the required charge and discharge cycle characteristics and a high energy density.

Additionally, the binder is added to securely adhere the positive electrode active material contained in the cathode and the conductive additive to each other. Without particularly limited, polytetrafluoroethylene (PTFE), polyvinylidene fluoride (PVDF), polyethylene-propylene-diene where the diene content is 10% or lower known as EPDM are preferred.

The content of binder in the cathode is preferably not higher than 40 mass % and not lower than 1 mass % in order to achieve a good adhesion between the active material and the conductive additive.

The cathode can be prepared by solvent-casting a slurry comprising the active material, the conductive additive, the binder and a solvent. Examples of solvents include an organic solvent, such as acetone or N-methyl-2-pyrrolidone (NMP). The slurry is then casted onto the aluminum or cooper foil and a free-standing electrode film is formed as the solvent evaporates. The electrode is then dried further at about 80-100° C. Alternatively, the slurry containing the active material, the conductive additive, the binder and the solvent can be casted onto a glass and, subsequently the current collector be applied.

Another aspect of the present invention refers to a sodium-ion battery comprising a cathode as defined above.

In a particular embodiment, said sodium-ion battery further comprises a negative electrode (anode) and an electrolyte. Thus, in this particular embodiment, the sodium-ion battery comprises a cathode comprising the positive electrode active material of the invention as defined above, an anode and an electrolyte.

In a particular embodiment, the electrolyte is a solid sodium ion-conductive ceramic electrolyte separating both positive electrode (cathode) and negative electrode (anode).

Suitable materials for the solid electrolyte may include β-alumina, β'-alumina and β"-alumina. Other exemplary electrolyte materials include silicophosphates, such as NASICON ($Na_{3-x}Zr_2Si_{2+x}P_{1+x}O_{12}$) wherein −1≤x≤2, and glassy ceramics, such as alkali-silicon sulfide glasses.

In a preferred embodiment, the solid sodium-ion conductive ceramic electrolyte includes beta"-alumina or NASICON, more preferably, the solid electrolyte includes beta"-alumina.

The solid sodium-ion conductive ceramic electrolyte can be sized and shaped to have a cross-sectional profile that is square, polygonal, circular, or clover leaf, to provide a maximum surface area for sodium ion transport, and can have a width to length ratio that is greater than about 1:10 along a vertical axis.

The solid electrolyte may be stabilized by the addition of small amounts of a dopant. The dopant may include one or more oxides selected from lithia, magnesia, zirconia, zinc oxide, and yttria.

These stabilizers may be used alone or in combination or even combined with other materials. In a particular embodiment, the solid electrolyte comprises beta"-alumina and may include one or more dopants.

In another particular embodiment, the anode of the battery comprises, as the main component, solid metallic sodium or an alloy comprising solid metallic sodium. The content of sodium in the anode is higher than 50 mass %.

The anode may further comprise additives which include an oxygen scavenger. Suitable metal oxygen scavengers include one or more of manganese, vanadium, zirconium, aluminum or titanium.

In a particular embodiment, the cathode, the anode and the electrolyte are incorporated in a battery case. This battery case includes electrode terminals which are extended from the inside to the outside of the battery case. The negative electrode current collector is in electrical communication with the anode, and the positive electrode current collector is in electrical communication with the cathode. Suitable materials for the anode current collector may include aluminium, tungsten, titanium, nickel, copper, molybdenum, and combinations of two or more thereof. Other suitable materials for the anode current collector may include carbon. The positive electrode current collector may be a wire, paddle or mesh formed from aluminium, palladium, gold, nickel, copper, carbon or titanium. The current collector may be plated or clad.

As will be appreciated by those skilled in the art, the sodium-ion battery of the present invention may be implemented in a variety of configurations and designs. For example, it can take a planar configuration or a tubular configuration in which the different components are contained inside a tubular assembly or housing to form the battery.

The sodium-ion battery of the invention can be used as an energy storage device, being rechargeable over a plurality of charge-discharge cycles. The energy storage device can be employed in a variety of applications, and the plurality of cycles for recharge is dependent on factors such as, charge and discharge current, depth of discharge, cell voltage limits, and the like.

EXAMPLES

Example 1

Synthesis of Pristine P2-phase Powder Materials

The following pristine P2-phase powder materials were synthesized:
$Na_{2/3}Mn_{0.8}Fe_{0.1}Ti_{0.1}O_2$, and its hydrated form.
$Na_{2/3}Mn_{0.8}Zn_{0.1}Al_{0.1}O_2$
$Na_{2/3}Mn_{0.8}Zn_{0.1}Cu_{0.1}O_2$ Na$_{2/3}$Mn$_{0.8}$Zn$_{0.1}$Ti$_{0.1}$O$_2$
Na$_{2/3}$Mn$_{0.8}$Fe$_{0.1}$Cu$_{0.1}$O$_2$
Na$_{2/3}$Mn$_{0.8}$Fe$_{0.1}$Al$_{0.1}$O$_2$
Na$_{2/3}$Mn$_{0.9}$Fe$_{0.05}$Ti$_{0.05}$O$_2$.

The different materials were synthesized by ceramic method. Thus, stoichiometric amounts of the reagents (Na$_2$CO$_3$, Mn$_2$O$_3$, Fe$_2$O$_3$, TiO$_2$, ZnO, CuO, Al$_2$O$_3$) in powdered form were physically mixed in a speed mixer in aqueous medium for 20 minutes at 1000 rpm. The mixture was quickly frozen by directly pouring liquid nitrogen into the mixing container and then dried in a freeze drier for 2 days. A pellet with a diameter of 20 mm and thickness of 3 mm was obtained and annealed at 1000° C. for 6 hours under normal atmospheric conditions and, upon free cooling, the pellet was quickly transferred to a glove box in order to avoid moisture contact.

Then, the powders were immediately frozen using liquid nitrogen, and dried using a freeze drier for 1 day. Dried powders were transferred to an Ar-filled glove box.

For the synthesis of the hydrated form of pristine P2-phase Na$_{2/3}$Mn$_{0.8}$Ti$_{0.1}$Fe$_{0.1}$O$_2$ (moisture exposure experiment), 100 mg of pristine P2-phase Na$_{2/3}$Mn$_{0.8}$Ti$_{0.1}$Fe$_{0.1}$O$_2$ powder was dispersed in 10 mL of distilled and deionized water for 24 hours. The powder was filtered and washed with 100 mL of distilled and deionized water. Then, the powder was immediately frozen using liquid nitrogen, and dried using a freeze drier for 1 day. Dried powder was transferred to an Ar-filled glove box.

The different materials were characterized by X-ray diffraction. XRD pattern of powder samples was collected using Bruker D8 Advanced with Cu Kα radiation of λ=1.5418 Å within the 2θ range of 15-80°. All samples were mounted onto an atmosphere protective XRD sample holder with Kapton film cover.

Pure materials were obtained in all the studied compositions.

P2-phase layered oxide is characterized by oxide layer stacking of AABBAA where Na$^+$ occupies trigonal prismatic sites and shares either entirely edge or entirely face with adjacent oxide layers as can be seen in FIG. 1.

The XRD pattern matching of the different pristine powder materials shows a good fit between Bragg positions and observed peaks without any noticeable impurity peaks, and all crystallized in the P6$_3$/mmc space group being cell parameters in good agreement with the reported values for Na$_x$MnO$_2$, a=b=2.8603 Å c=11.153 Å.

FIG. 1 depicts the X-ray diffractogram of the Na$_{2/3}$Mn$_{0.8}$Ti$_{0.1}$Fe$_{0.1}$O$_2$ sample, whereas FIG. 2 shows the X-ray diffractogram of (a) Na$_{2/3}$Mn$_{0.8}$Zn$_{0.1}$Al$_{0.1}$O$_2$; (b) Na$_{2/3}$Mn$_{0.8}$Zn$_{0.1}$Cu$_{0.1}$O$_2$; (c) Na$_{2/3}$Mn$_{0.8}$Zn$_{0.1}$Ti$_{0.1}$O$_2$; (d) Na$_{2/3}$Mn$_{0.8}$Fe$_{0.1}$Cu$_{0.1}$O$_2$; (e) Na$_{2/3}$Mn$_{0.8}$Fe$_{0.1}$Al$_{0.1}$O$_2$; and (f) Na$_{2/3}$Mn$_{0.9}$Fe$_{0.05}$Ti$_{0.05}$O$_2$ samples.

Cell parameters are listed in Table 1:

TABLE 1

Cell parameters and oxidation state of manganese of the different materials synthesized.

| Sample | Cell parameters a = b (Å) | c (Å) | Oxidation state of Mn |
|---|---|---|---|
| Na$_{2/3}$Mn$_{0.8}$Fe$_{0.1}$Ti$_{0.1}$O$_2$ | 2.9143(2) | 11.184(1) | |
| Na$_{2/3}$Mn$_{0.8}$Zn$_{0.1}$Al$_{0.1}$O$_2$ | 2.8772(5) | 11.179(3) | 3.55 |
| Na$_{2/3}$Mn$_{0.8}$Zn$_{0.1}$Cu$_{0.1}$O$_2$ | 2.9253(7) | 11.241(3) | 3.67 |
| Na$_{2/3}$Mn$_{0.8}$Zn$_{0.1}$Ti$_{0.1}$O$_2$ | 2.9055(3) | 11.196(2) | 3.42 |
| Na$_{2/3}$Mn$_{0.8}$Fe$_{0.1}$Cu$_{0.1}$O$_2$ | 2.8806(2) | 11.174(1) | 3.67 |
| Na$_{2/3}$Mn$_{0.8}$Fe$_{0.1}$Al$_{0.1}$O$_2$ | 2.8723(5) | 11.197(2) | 3.42 |
| Na$_{2/3}$Mn$_{0.9}$Fe$_{0.05}$Ti$_{0.05}$O$_2$ | 2.8934(5) | 11.175(1) | 3.32 |

A deviation in a-parameter comparing unsubstituted compound is due to the introduction of larger ionic radii Ti$^{4+}$, Cu$^{2+}$ or Al$^{3+}$, into the oxide layer. By unsubstituted compounds are understood those containing Na and Mn without any other metallic element partially substituting Mn.

For the case of hydrated samples, moisture exposure is known to cause Na$^+$/H$^+$ exchange to form protonated phase, and further exposure to moisture promotes the formation of hydrated phase where H$_2$O molecules occupy vacancy interlayer spacing. The XRD pattern of hydrated state, refined using hexagonal P6$_3$/mmc symmetry by assuming both protonated and hydrated phase (2θ=25.3°), resulted also a good fit with observed pattern without any impurities. Slight decrease in a-parameter and increase in c-parameter are characteristics of protonated phase, and even larger c-parameter is observed for hydrated phase because large water molecules occupy interlayer space.

Figure 3:
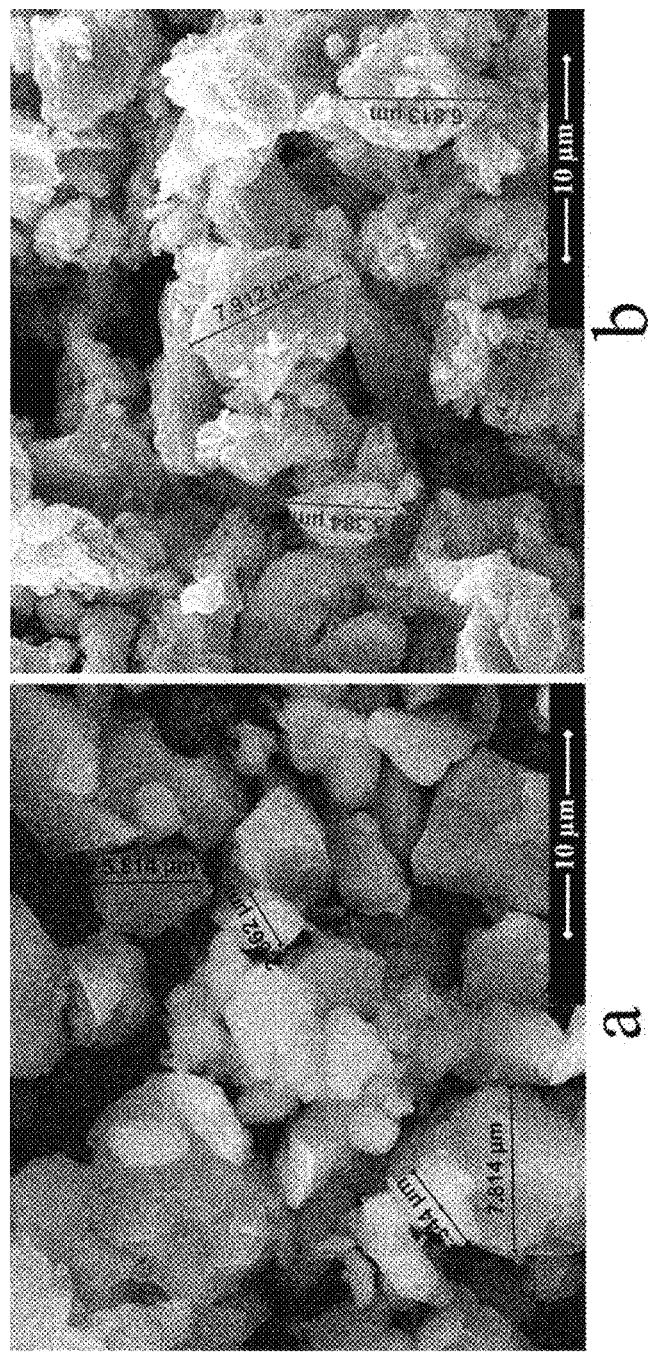
FIG. 3. SEM micrographs of a) pristine P2-phase $Na_{2/3}Mn_{0.8}Ti_{0.1}Fe_{0.1}O_2$ powder; b) moisture exposed powder.

FIG. 3 shows SEM micrographs of pristine P2-phase Na$_{2/3}$Mn$_{0.8}$Fe$_{0.1}$Ti$_{0.1}$O$_2$ and its hydrated form.

Example 2

Preparation of Electrodes Comprising Pristine P2-phase Powder Materials as Active Material and Cell Assemblies Containing Said Electrodes Slurry electrodes were prepared by mixing the pristine P2-phase powder material prepared according to example 1, super carbon C$_{65}$ and PVDF (polyvinylidene difluoride) in a mass ratio of 80:10:10 in NMP (N-methyl-2-pyrrolidone) followed by vigorous stirring for 2 hours. The slurry then was casted onto an aluminum current collector sheet using a mini coater. The laminate was vacuum-dried at 120° C. for 12 hours. Circular electrodes were punched out and pressed at 5 tons prior to battery assembly. Na half-cells were constructed with 1.0 M NaPF$_6$ in EC (ethylene carbonate): PC (propylene carbonate):FEC (fluoroethylene carbonate) in 49:49:2 ratio and metallic Na as anode in a 2032 coin cell in an Ar-filled glove box.

Example 3

Electrochemical Tests for the Electrode Containing Na$_{2/3}$Mn$_{0.8}$Fe$_{0.1}$Ti$_{0.1}$O$_2$ as Active Material The galvanostatic electrochemical testing was performed with BioLogic VMP3 within the voltage range of 4.0-2.0 V. All the C-rates are calculated based on full theoretical specific capacity of 245.19 mAh/g of 1 Na de-intercalation.

Figure 4:
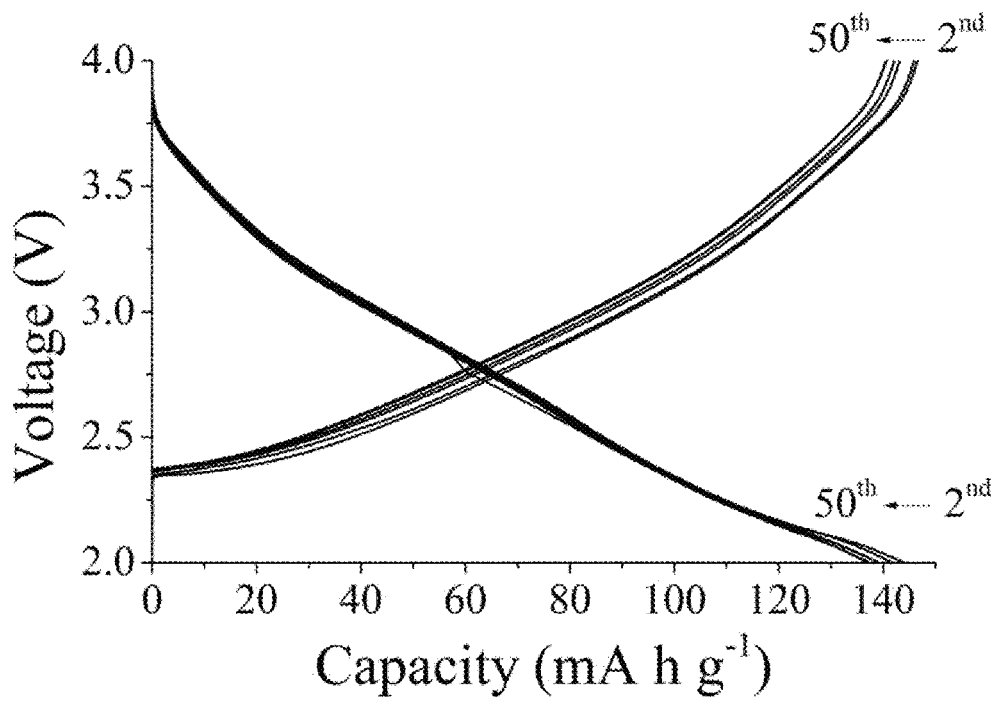
FIG. 4. Charge/discharge profile of: (a) pristine P2-phase $Na_{2/3}Mn_{0.8}Ti_{0.1}Fe_{0.1}O_2$ electrode; (b) hydrated electrode.
Figure 4:
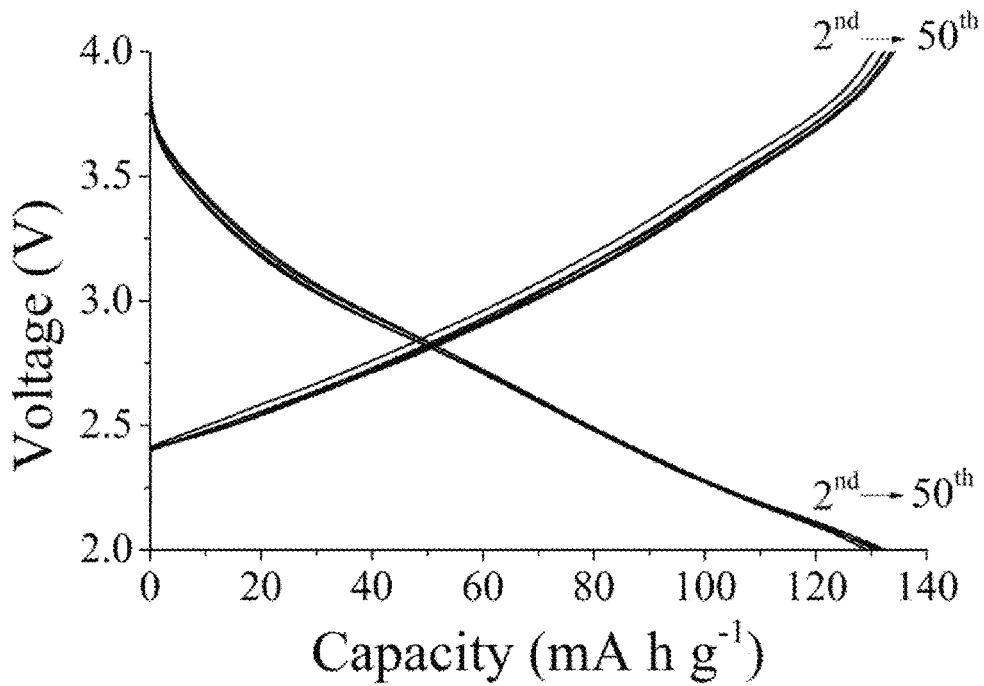

Galvanostatic charge/discharge profile of pristine P2-phase Na$_{2/3}$Mn$_{0.8}$Ti$_{0.1}$Fe$_{0.1}$O$_2$ from the second to 50$^{th}$ cycle is shown in FIG. 4(a). The pristine electrode delivered a second charge/discharge capacity of 146.57/144.16 mAh/g within the voltage range 4.0-2.0 V at C/10 which implies the utilization of approximately 0.60 Na considering full capacity of 245.19 mAh/g.

The hydrated electrode delivered a second charge/discharge capacity of 130.40/129.22 mAh/g (FIG. 4(b)), which slightly increases to reach the maximum over 134 mAh/g. Slight increase in reversible capacity during the first cycles is probably due to redistribution and stabilization of $Na^+$ and $H^+$ in the interlayer spacing. It should be noted that fully sodiated phase could not be obtained during the discharge down to 2.0 V because of strong distorsion induced by increasing concentration of high spin $Mn^{3+}$ as well as excessive positive charge from $Ti^{4+}$, and the concentration of Na during the charge process up to 4.0 V did not reach beyond 0.35 Na, which implies that P2-O2 transition does not occur during deintercalation process.

The average voltage and energy density of pristine electrode were calculated to be 2.77 V and 399.32 mWh/g vs. Na, respectively, and this energy density approaches to that of $LiMnO_2$.

Figure 5:
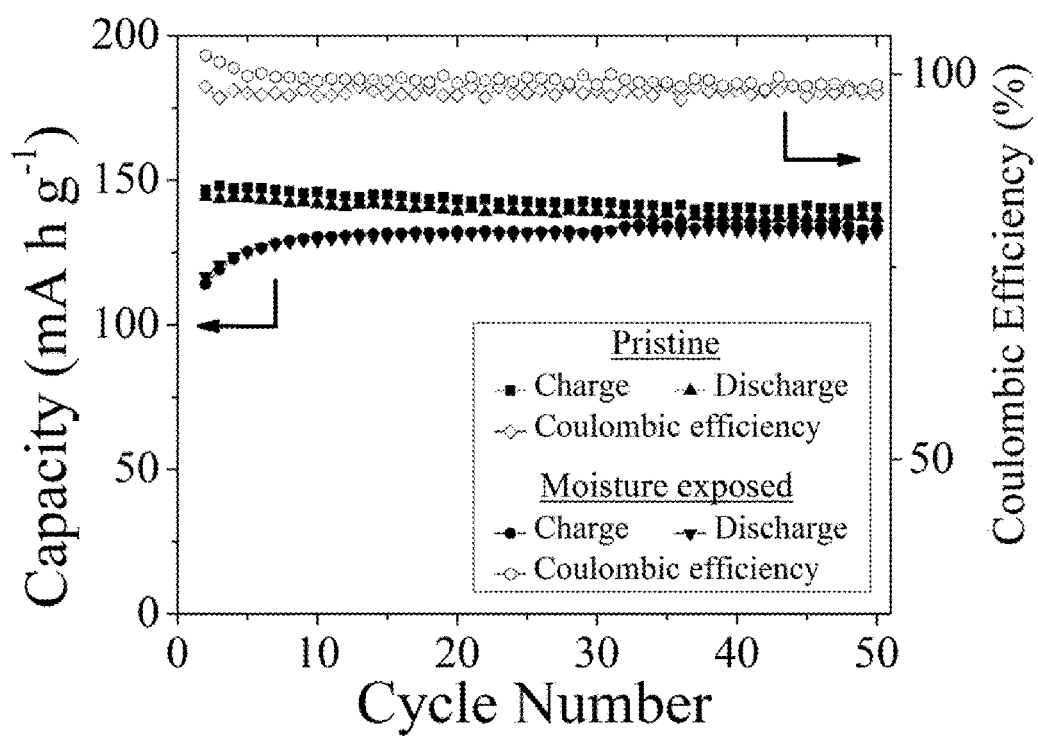
FIG. 5. Plot of capacity retentions and Coulombic efficiency as a function of cycle number within the voltage range 4.0-2.0 V at C/10 for 50 cycles.

Within the given voltage range, the charge/discharge curves of both electrodes (non-hydrated and hydrated) are smooth comparing to unsubstituted counterpart, without any apparent plateau being indicative of improved structural stability. Furthermore, Fe is electrochemically inactive during de/intercalation process because Mn to Fe redox transition plateau does not appear. As can be seen in FIG. 5, the pristine electrode exhibits an excellent capacity retention by maintaining 95.09% of discharge capacity at $50^{th}$ cycle comparing to second cycle (only 0.1% capacity degradation on each cycle) along with over 98% Coulombic efficiency which points out the improved electrochemical properties of the active material of the invention.

The hydrated electrode exhibited even better performance by retaining over 99% of reversible capacity after initial increase in specific capacity.

The electrochemical process is solely based on $Mn^{3+}$/$Mn^{4+}$ redox process because $Ti^{4+}$ is electrochemically inactive at the tested voltage range and $Fe^{3+}$ plateau does not appear up to 4.0 V. During the discharge process, the Mn should be reduced to 3+ oxidation state where high spin $Mn^{3+}$ induces strong Jahn-Teller distorsion, being this effect opposite during the charge process due to increasing concentration of high spin $Mn_{4+}$. However, and compared to unsubstituted compounds, the partially substituted $Na_{2/3}Mn_{0.8}Fe_{0.1}Ti_{0.1}O_2$ compound exhibits much enhanced electrochemical performances including smoothness of profile and excellent capacity retention.

Furthermore, comparing to compounds having larger substitutions of various transition metals into Mn containing layered oxides which have demonstrated either to attain structural stability at an expense of specific capacity or to have a high specific capacity at an expense of structural stability, the active material used in the present invention attains vastly improved structural stability while retaining high specific capacity at low level of substitution, which illustrates the possibility of full utilization of maximum energy density with long term stability for layered oxide Na-ion battery cathode.

Figure 6:
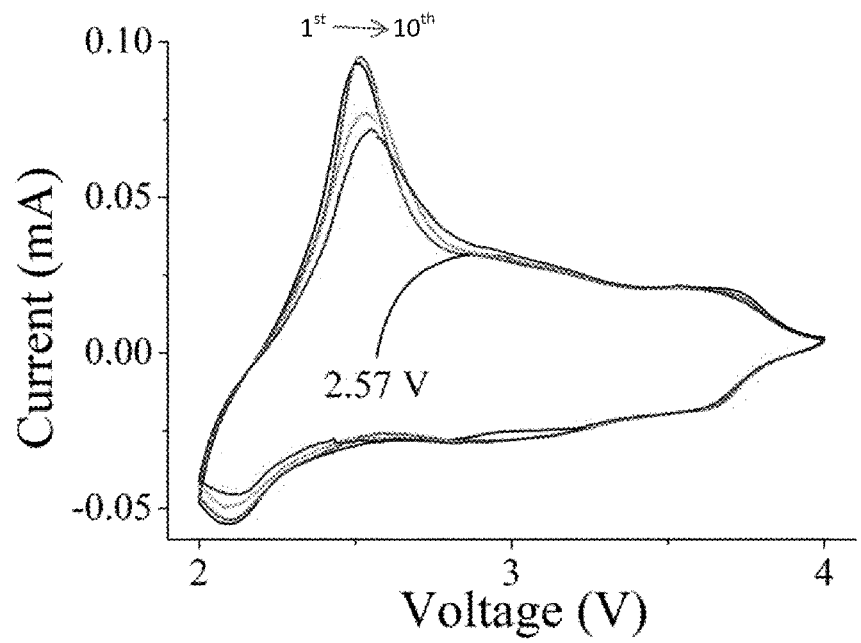
FIG. 6. Cyclic voltammogram of: (a) pristine P2-phase $Na_{2/3}Mn_{0.8}Ti_{0.1}Fe_{0.1}O_2$ electrode; (b) hydrated electrode, within the voltage range of 4.0-2.0 V at the scan rate of 0.1 mV/s.
Figure 6:
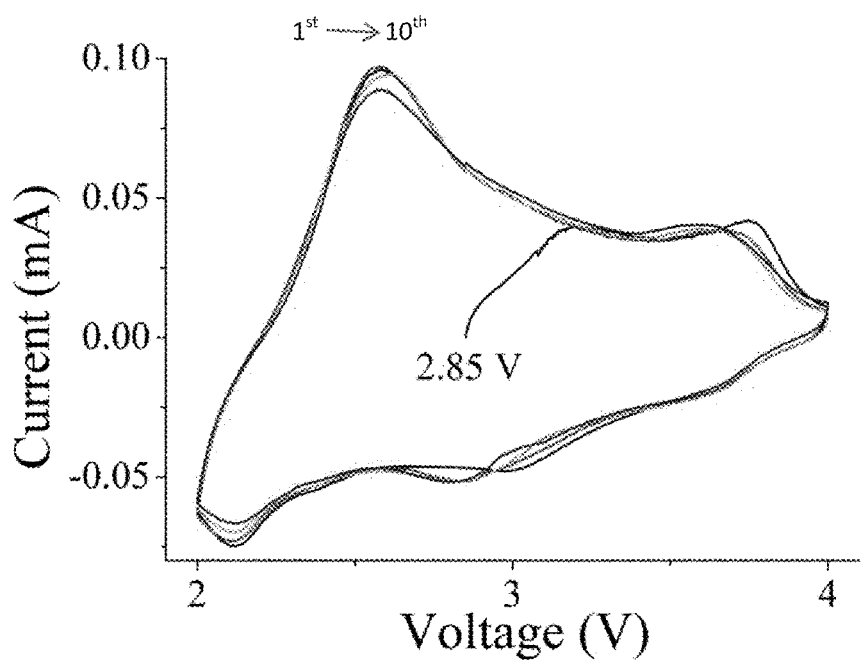

FIGS. 6(a) and 6(b) are cyclic voltammogram of pristine and hydrated phase at given voltage. No peaks, other than that at 2.51 V, relating to redox couple or phase change are observed for pristine electrode, which is in good agreement with smooth charge/discharge profile without plateau behavior. Cyclic voltammogram of hydrated phase is somewhat noisy during the first few cycles, but becomes smooth later on. This observation is reflected on the capacity retention plot where a slight increase in reversible capacity occurs during the first cycles. No peaks relating to redox couple or phase changes were observed.

Figure 7A:
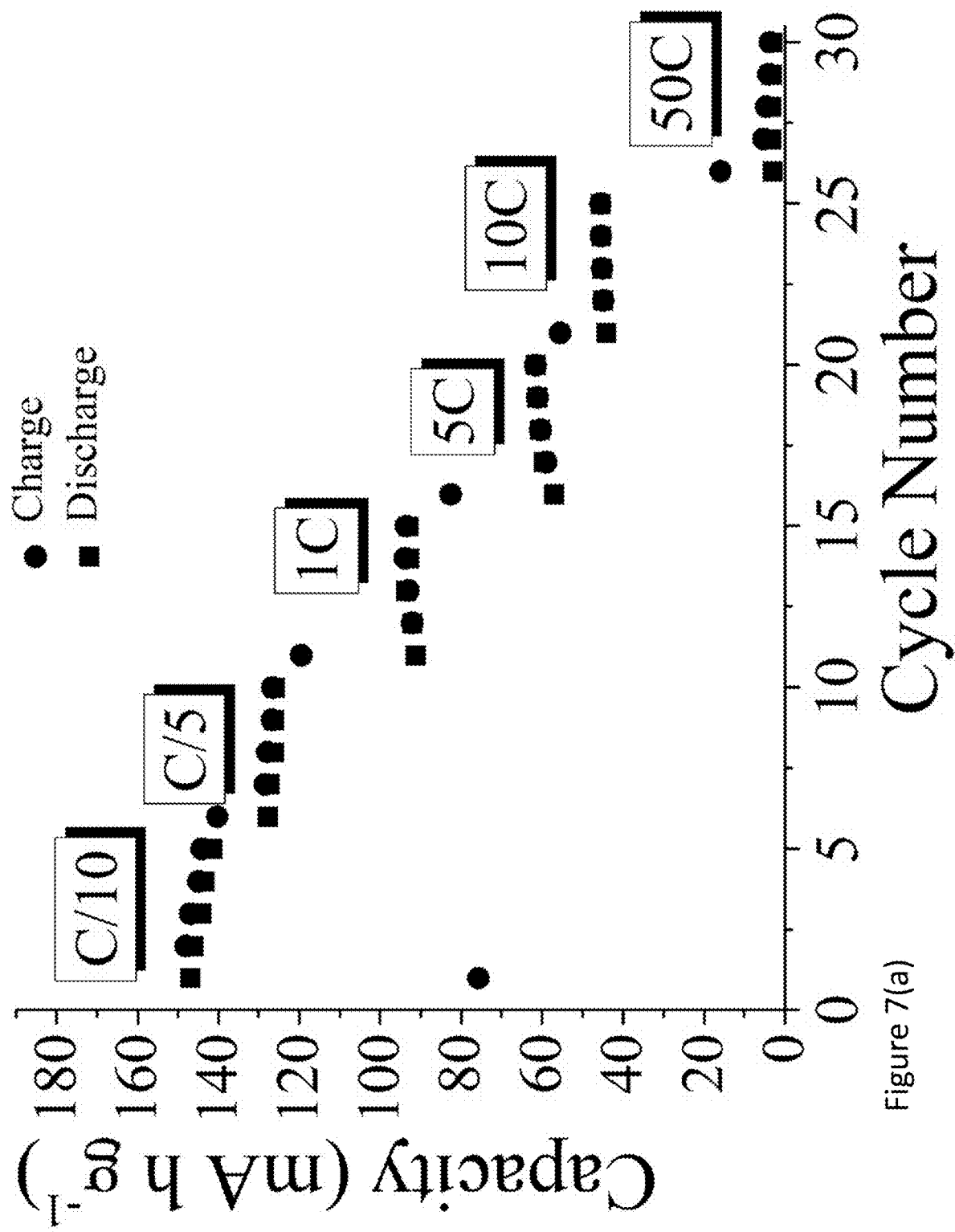
FIG. 7. Rate capability of: (a) pristine P2-phase $Na_{2/3}Mn_{0.8}Ti_{0.1}Fe_{0.1}O_2$ electrode; (b) hydrated electrode, within the voltage range 4.0-2.0 V. Applied current densities are $24.50e^{-3}$ (C/10), $49.00 e^{-3}$ (C/5), $245.0e^{-3}$ (1C), 1.225 (5C), 2.449 (10C), and 12.25 (50C) A/g.

As can also be seen in FIG. 7(a), the pristine electrode exhibits a remarkable rate capability by maintaining 99.40 mAh/g discharge capacity at 1C which is 68.95% of C/10, and such high rate capability indicates a fast de/intercalation kinetic of pristine electrode. Such high rate capability is unique among the Na layered oxide considering the bulkiness of the particle, and further increase of rate capability could be possible by reducing the size of carbon coating.

Figure 7B:
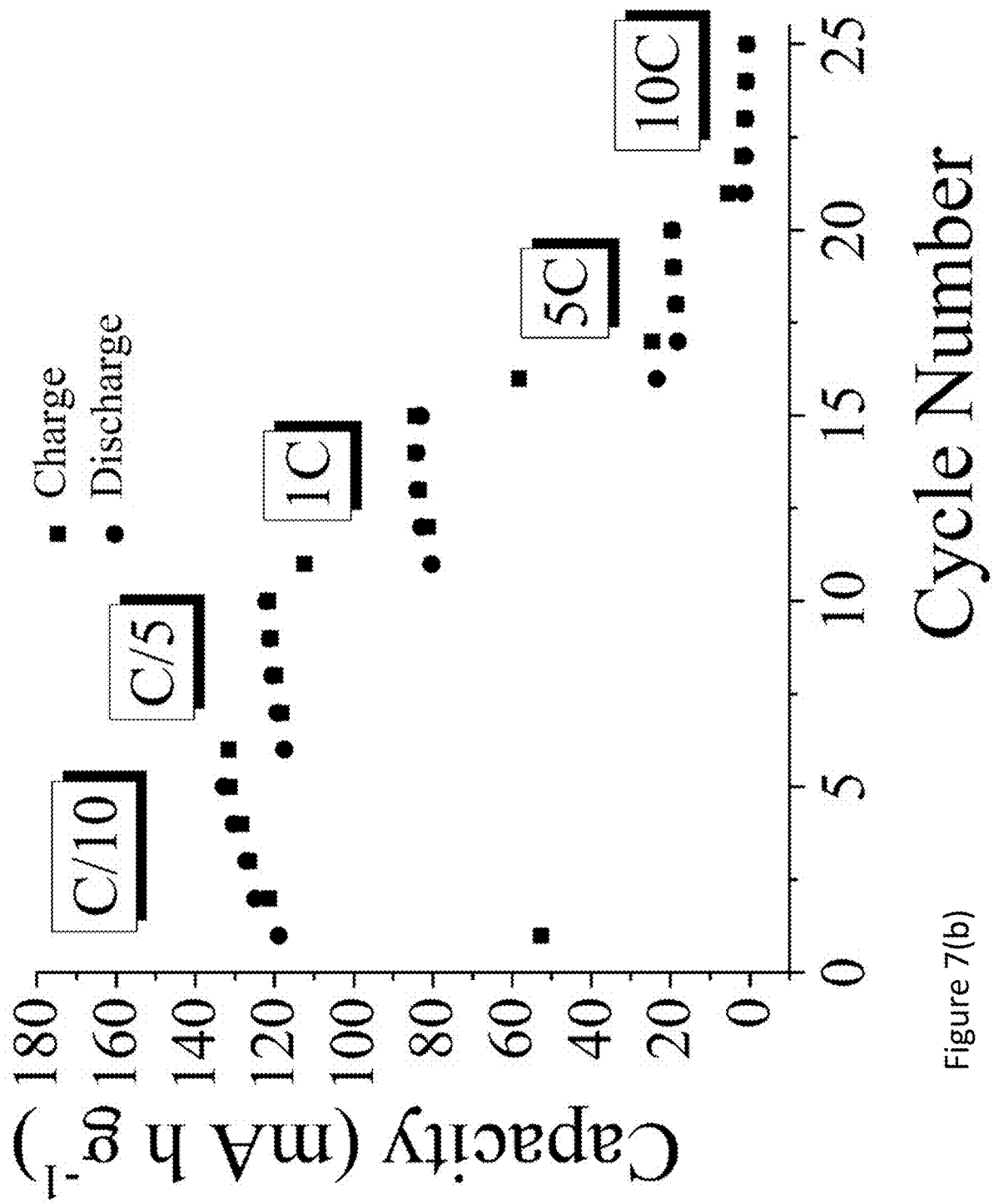

As can be seen in FIG. 7(b), the hydrated state electrode exhibited slightly lower rate capability specifically at 5C or higher rate, which is attributed to a reduced kinetic by interlayer proton and water molecule, acting as diffusion block.

Figure 8:
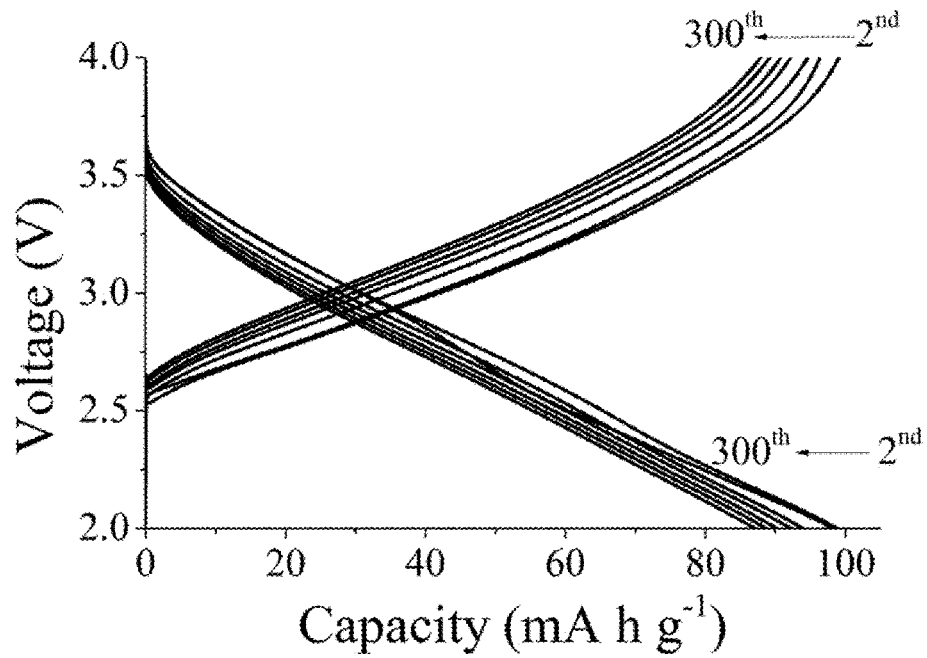
FIG. 8. (a) Charge/discharge profile of pristine P2-phase $Na_{2/3}Mn_{0.8}Ti_{0.1}Fe_{0.1}O_2$ electrode; (b) Plot of capacity retentions and Coulombic efficiency as a function of cycle number within the voltage range 4.0-2.0 V at 1C for 300 cycles.
Figure 8:
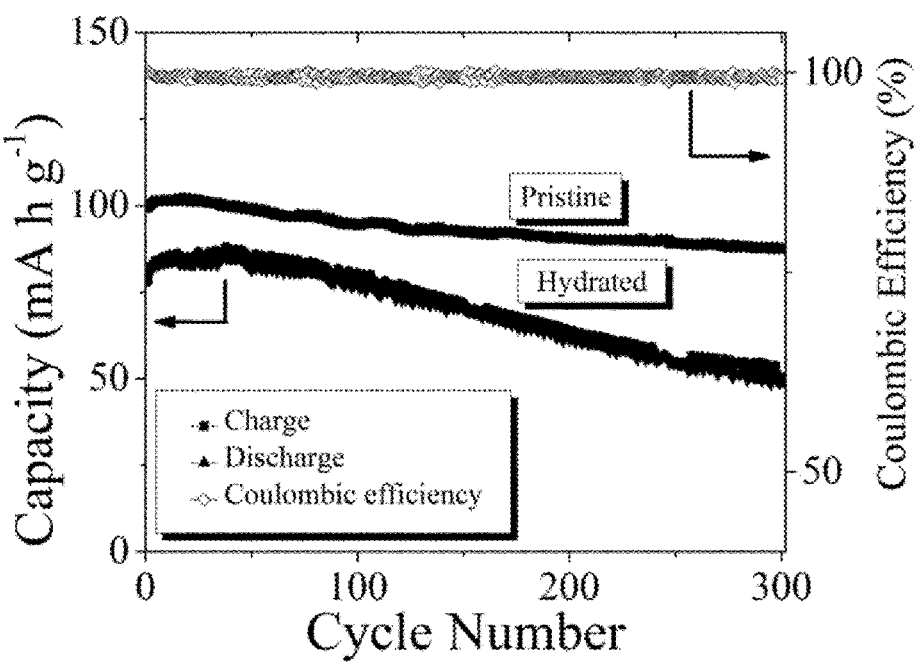
Figure 9A:
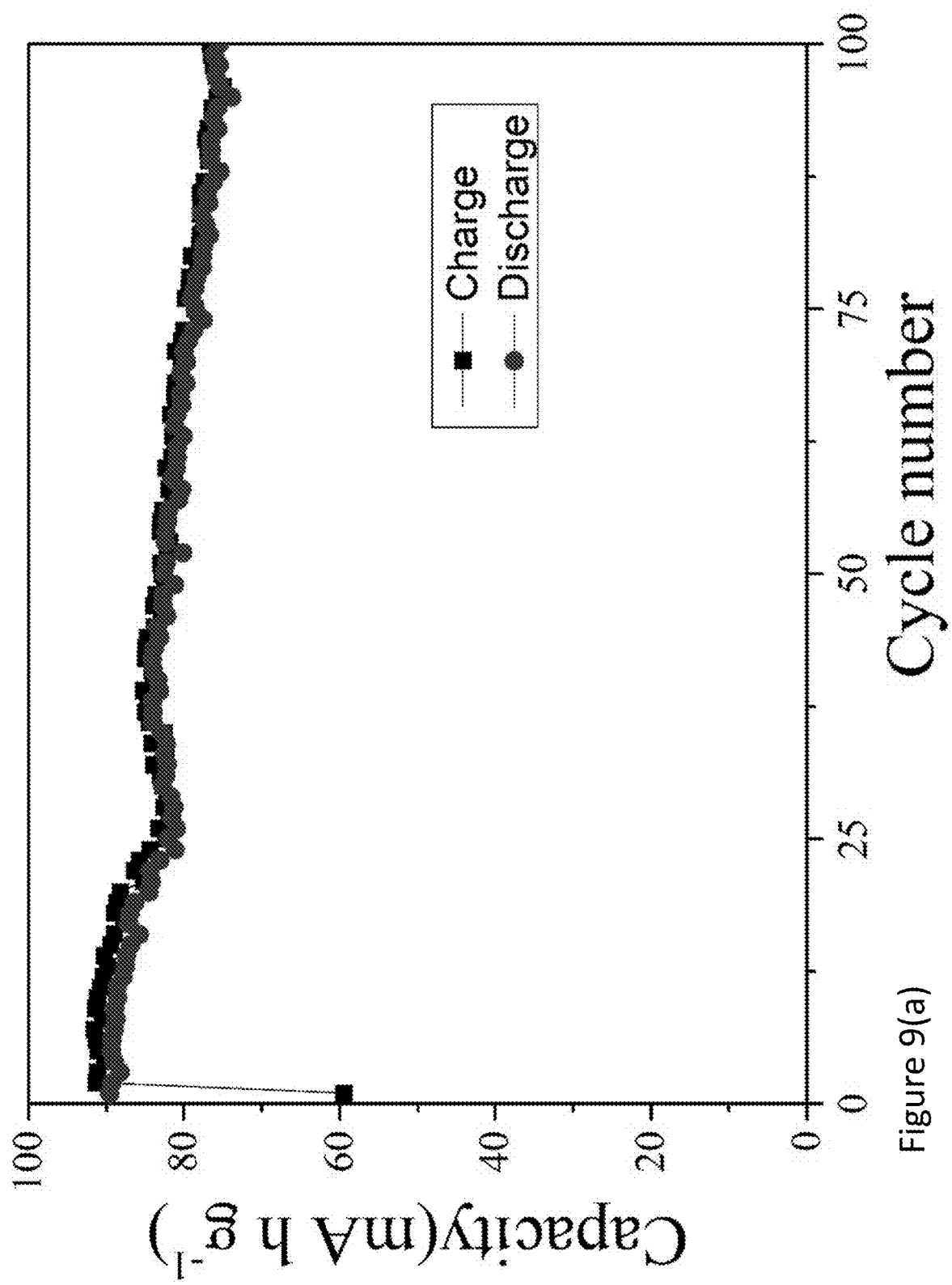
FIG. 9. Cycling stability performance of (a) $Na_{2/3}Mn_{0.8}Zn_{0.1}Cu_{0.1}O_2$; (b) $Na_{2/3}Mn_{0.8}Zn_{0.1}Ti_{0.1}O_2$; (c) $Na_{2/3}Mn_{0.8}Fe_{0.1}Cu_{0.1}O_2$; (d) $Na_{2/3}Mn_{0.8}Fe_{0.1}Al_{0.1}O_2$, at 1C in the 2-4 V voltage range.
Figure 9B:
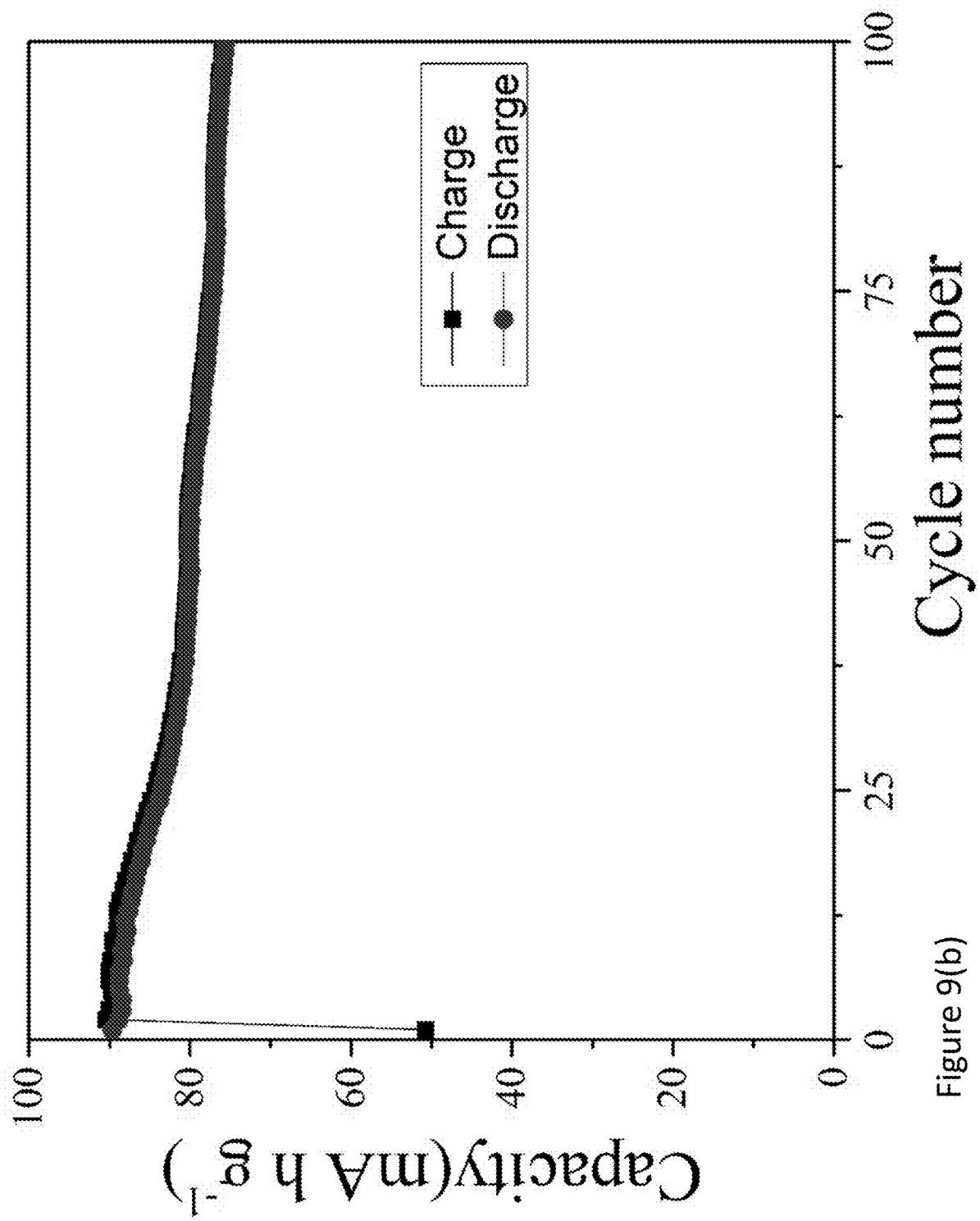
Figure 9C:
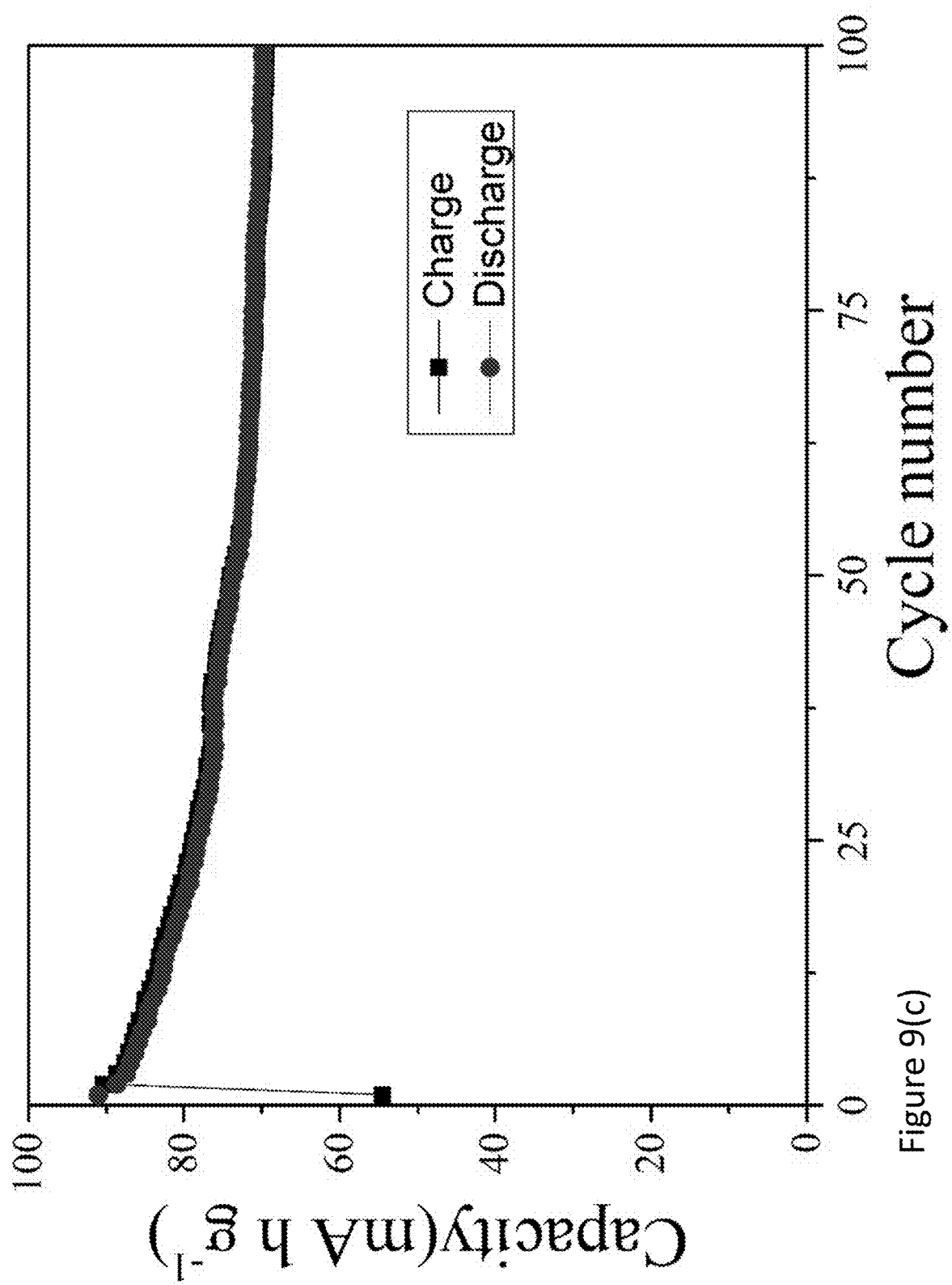
Figure 9D:
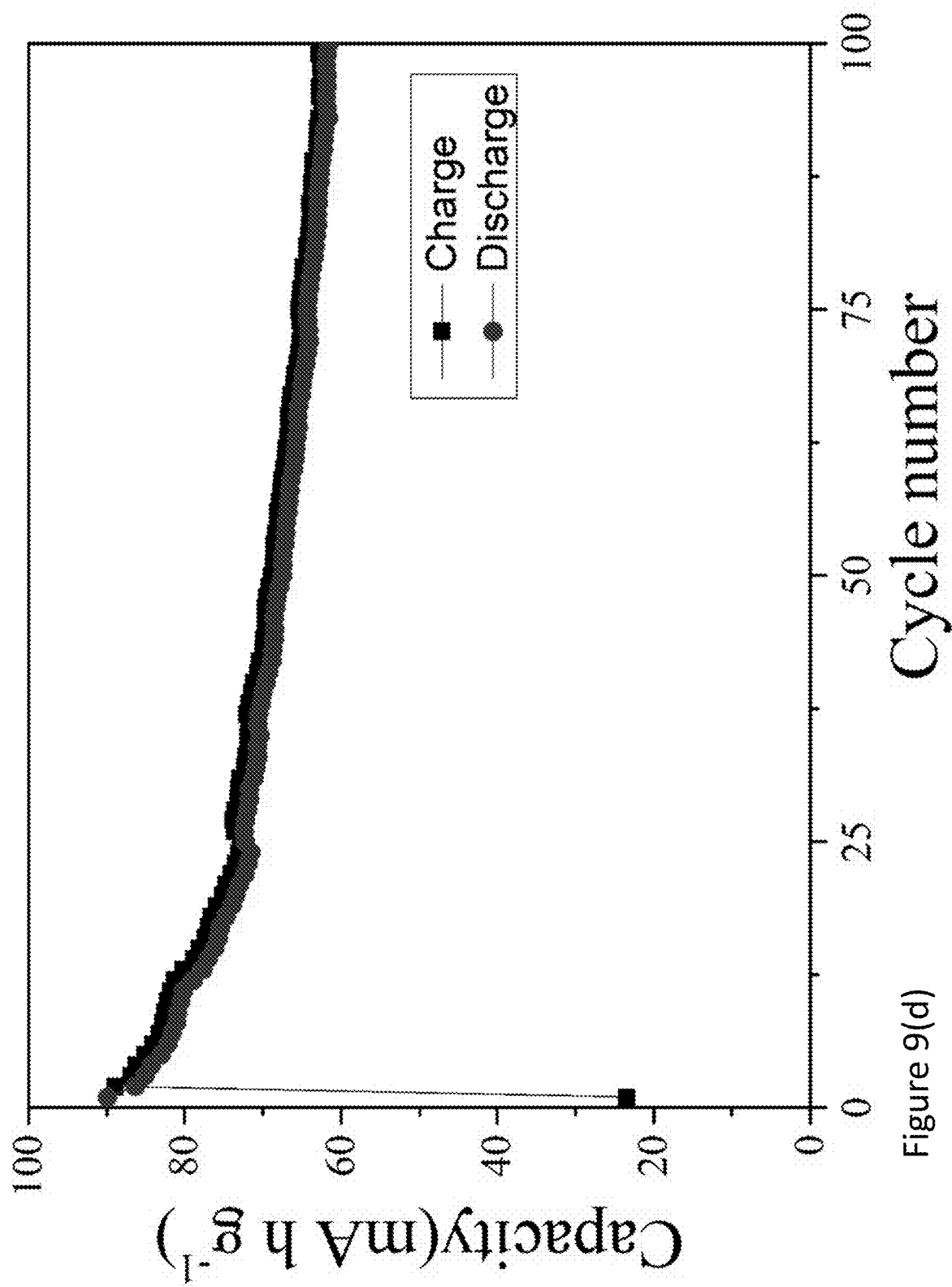
Figure 10A:
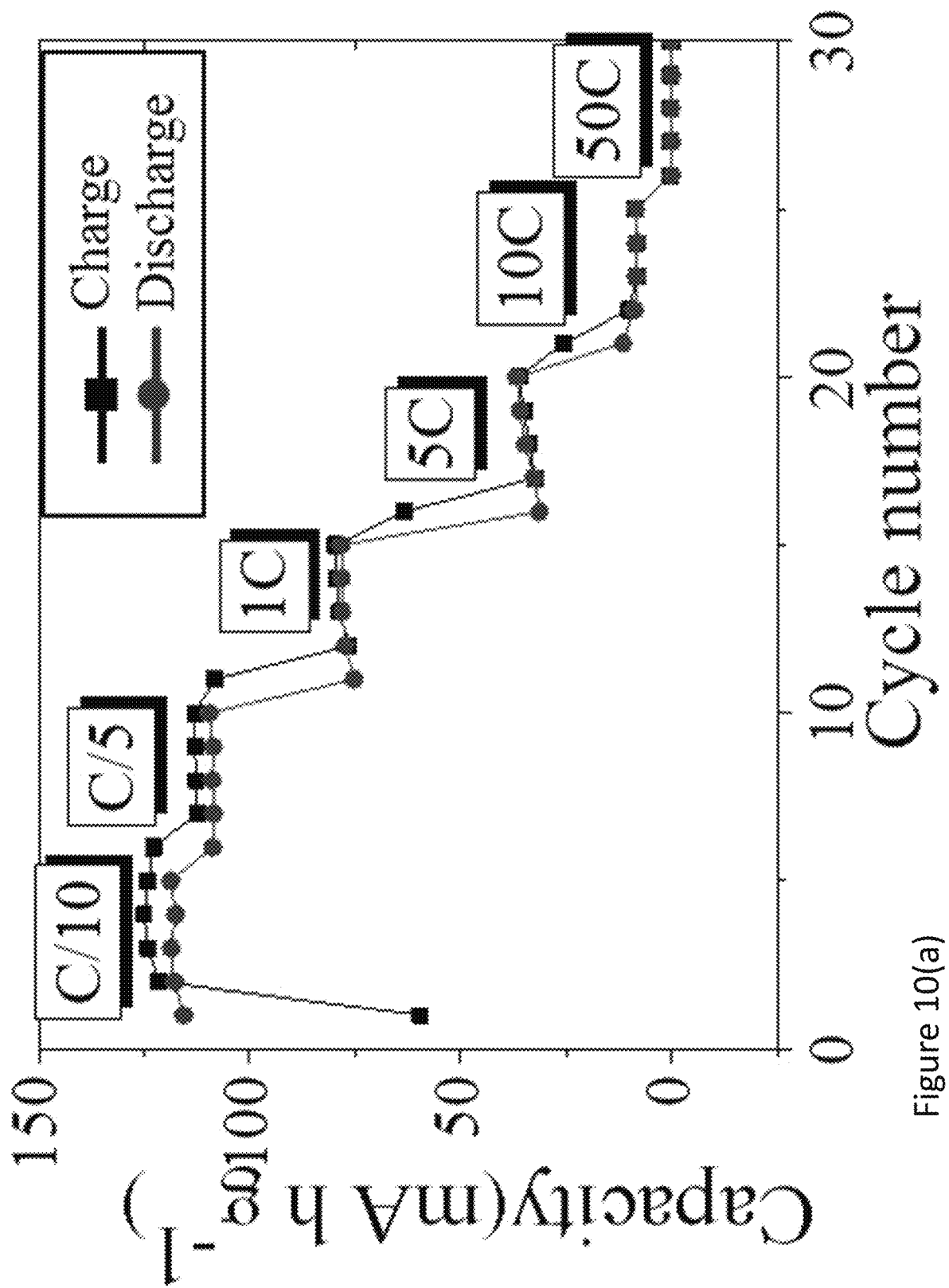
FIG. 10. Rate capability performance of (a) $Na_{2/3}Mn_{0.8}Zn_{0.1}Cu_{0.1}O_2$; (b) $Na_{2/3}Mn_{0.8}Zn_{0.1}Ti_{0.1}O_2$; (c) $Na_{2/3}Mn_{0.8}Fe_{0.1}Cu_{0.1}O_2$; (d) $Na_{2/3}Mn_{0.8}Fe_{0.1}Al_{0.1}O_2$, in the 2-4 V voltage range.
Figure 10B:
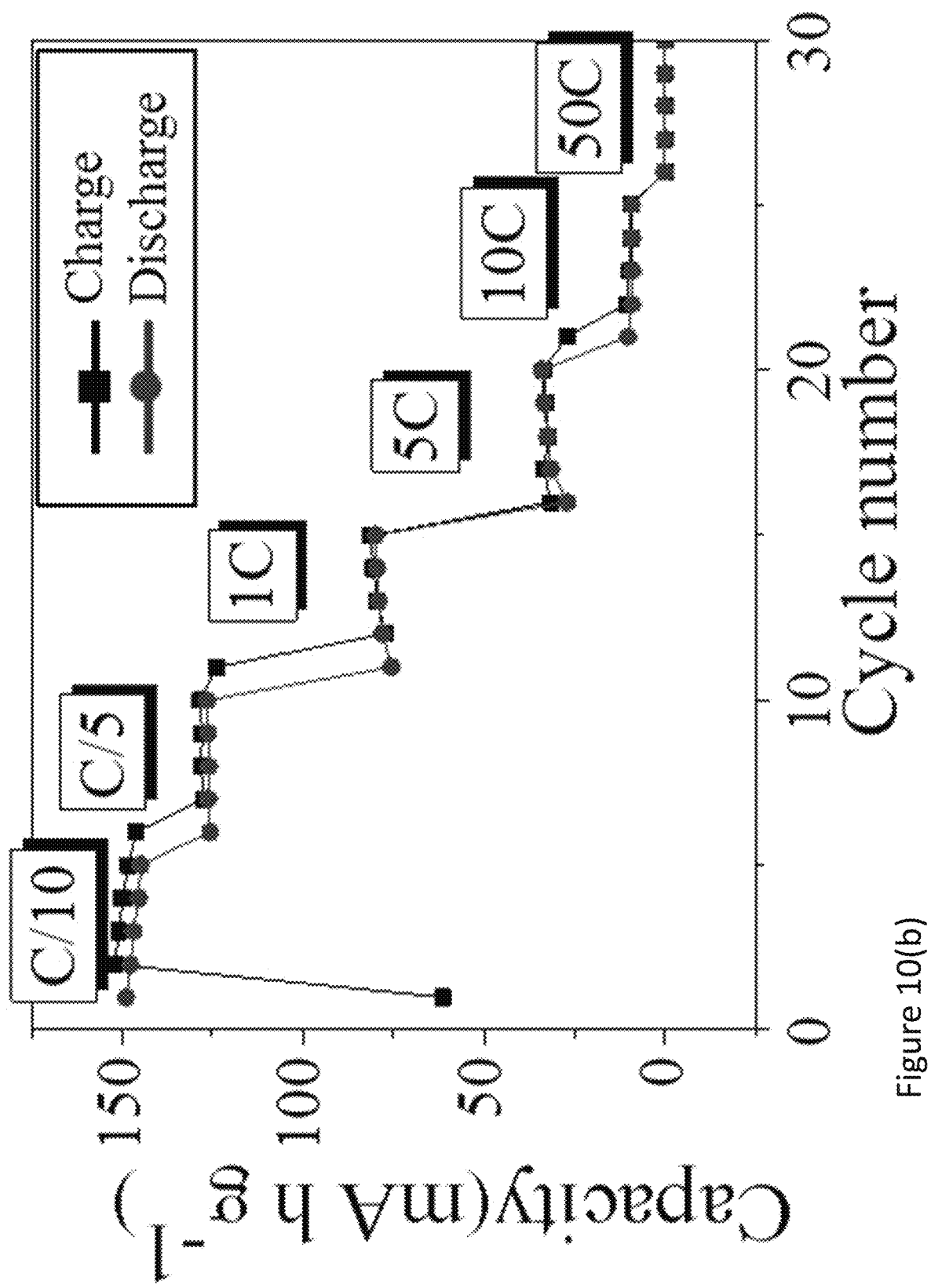
Figure 10C:
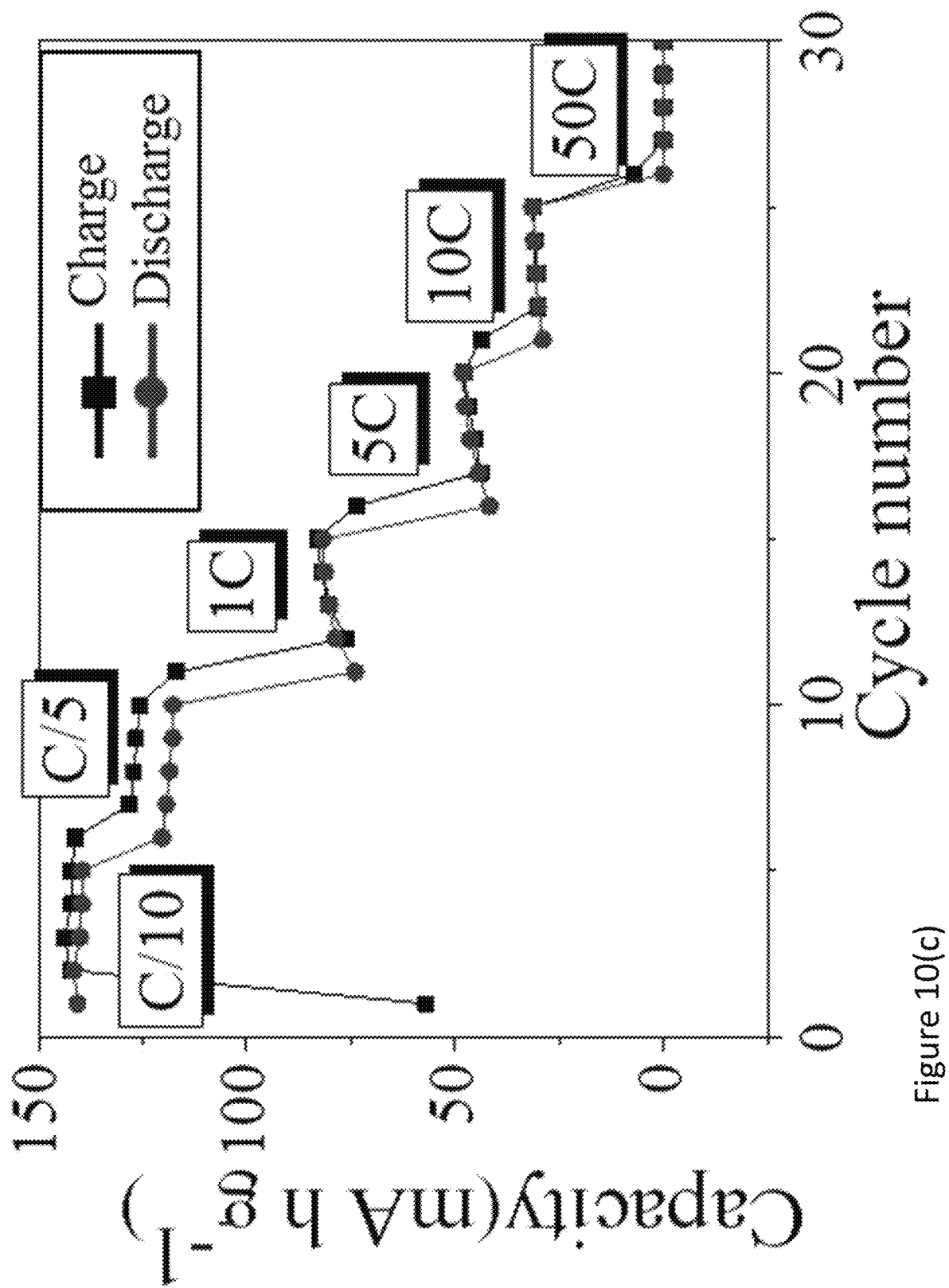
Figure 10D:
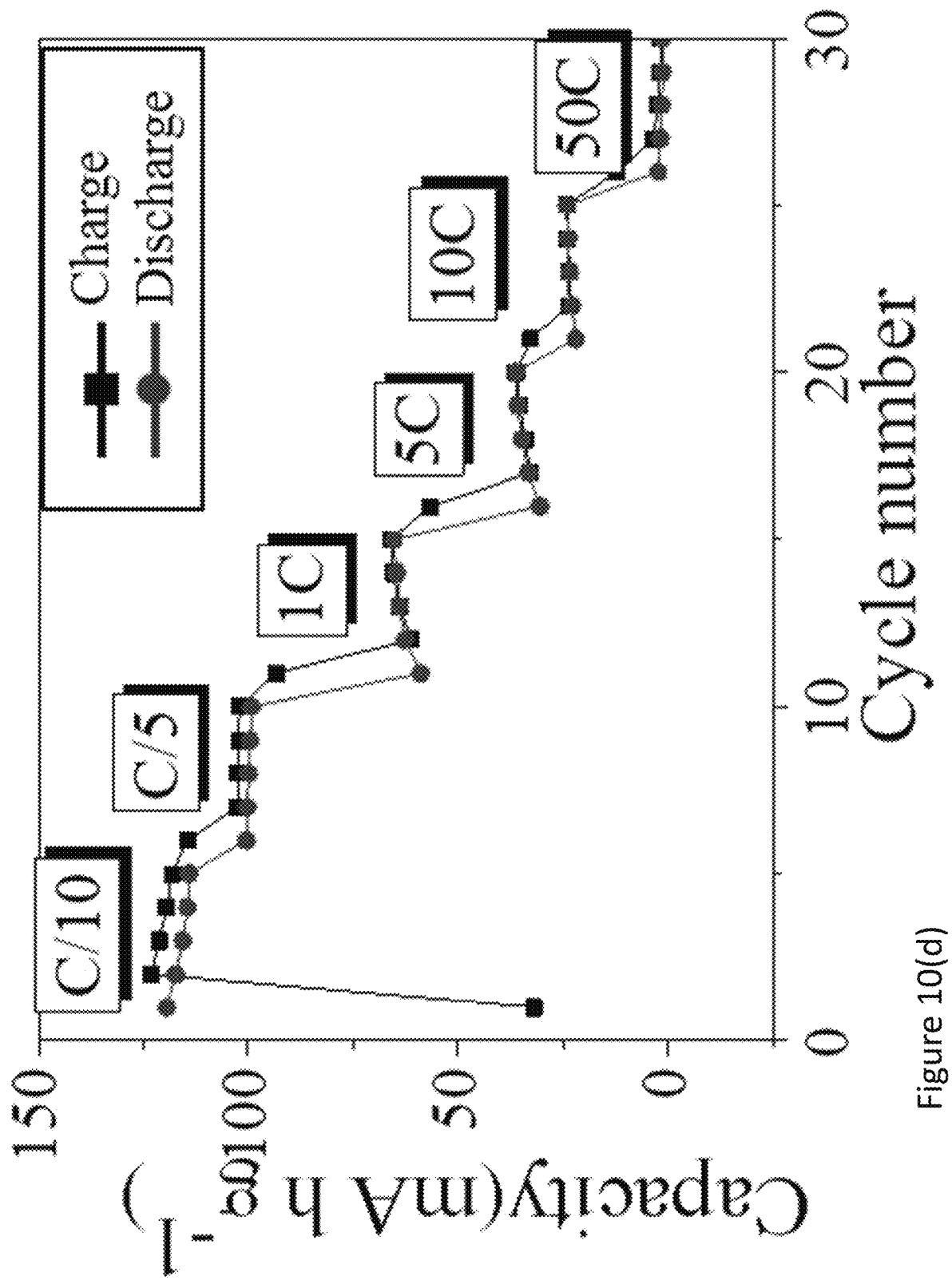

FIG. 8 shows the cycling profile and capacity retention plot of pristine electrode at 1C for 300 cycles. The exceptional stability is achieved by maintaining 87.17 mAh/g at $300^{th}$ cycle, which means 87.70% capacity retention from the second cycle (0.041% capacity degradation on each cycle). Coulombic efficiency is near 100% for all cycles, while the polarization (18.93-8.18 mV) is almost identical to that of C/10.

Example 4

Electrochemical Tests for the Electrodes Containing $Na_{2/3}Mn_{0.8}Zn_{0.1}Al_{0.1}O_2$; $Na_{2/3}Mn_{0.8}Zn_{0.1}Cu_{0.1}O_2$; $Na_{2/3}Mn_{0.8}Zn_{0.1}Ti_{0.1}O_2$; $Na_{2/3}Mn_{0.8}Fe_{0.1}Cu_{0.1}O_2$; $Na_{2/3}Mn_{0.8}Fe_{0.1}Al_{0.1}O_2$ or $Na_{2/3}Mn_{0.9}Fe_{0.05}Ti_{0.05}O_2$ The galvanostatic electrochemical testing was performed with BioLogic VMP3 within the voltage range of 4.0-2.0 V. Two different protocols were used; the first one is the cycling stability test at 1C for 40 cycles and the second one the rate capability test (5 cycles at C/10, C/5, 1C, 5C, 10C and 50C).

4.1. Cycling Stability Test at 1C

The electrochemical performance of the layered oxides at 1C after 100 cycles can be observed in FIG. 9 for (a) $Na_{2/3}Mn_{0.8}Zn_{0.1}Cu_{0.1}O_2$; (b) $Na_{2/3}Mn_{0.8}Zn_{0.1}Ti_{0.1}O_2$; (c) $Na_{2/3}Mn_{0.8}Fe_{0.1}Cu_{0.1}O_2$ and (d) $Na_{2/3}Mn_{0.8}Fe_{0.1}Al_{0.1}O_2$.

A remarkable good stability at 1C was found for the four presented examples. In the case of Zn—Cu and Zn—Ti combinations; 76.53 mAh/g and 75.78 mAh/g charge capacity values were found respectively after 100 cycles at 1C; which represent 83.8% and 83.7% of the initial capacity at 1C ($2^{nd}$ cycle). It has been therefore proved that these "electrochemically inactive elements" act as junctions holding the layered structures and improving their electrochemical performance at high C-rates.

In the other two cases (c) and (d), although the electrochemical performance of the materials was still good, a slight capacity drop in the first 25 cycles from 90.33 mAh/g and 88.95 mAh/g (second charge capacity) respectively to 78.86 mAh/g and 72.82 mAh/g could be found. These values remain almost constant until the $100^{th}$ cycle.

The different capacity values upon cycling ($1^{st}$, $2^{nd}$, $25^{th}$ and $100^{th}$ cycle) can be found in table 2.

TABLE 2

Electrochemical capacity values of some layered oxides in the $1^{st}$, $2^{nd}$, $25^{th}$ and $100^{th}$ cycle.

| Compound | $1^{st}$ charge/disch | $2^{nd}$ charge/disch | $25^{th}$ charge/disch | $100^{th}$ charge/disch |
|---|---|---|---|---|
| $Na_{2/3}Mn_{0.8}Zn_{0.1}Cu_{0.1}O_2$ | 59.49/89.53 | 91.24/89.26 | 90.30/87.86 | 76.53/75.47 |
| $Na_{2/3}Mn_{0.8}Zn_{0.1}Ti_{0.1}O_2$ | 50.71/89.69 | 90.43/88.90 | 84.35/83.50 | 75.78/75.56 |
| $Na_{2/3}Mn_{0.8}Fe_{0.1}Cu_{0.1}O_2$ | 54.48/91.02 | 90.33/88.68 | 78.86/78.23 | 69.45/69.79 |
| $Na_{2/3}Mn_{0.8}Fe_{0.1}Al_{0.1}O_2$ | 23.43/89.89 | 88.95/86.32 | 72.82/72.21 | 62.47/61.55 |

Rate Capability Test.

FIG. 10 shows the electrochemical performance of the above mentioned materials at different C-rates up to 50C.

A normal diminution of the capacity values when the current is increased can be observed in all the cases, but it has to be noticed that when the C/10 rate is recovered in the $30^{th}$ cycle the capacity values are recovered as they were in the $5^{th}$ cycle (see Table 4).

The Coulombic efficiency in all the materials is very close to 100% even at very high currents such as 50C (although capacity values are reaching neglectful values at these high current values). The presence of higher oxidation state for Manganese in a) and c) materials (see Table 2) can be translated in a better Coulombic efficiency in the last $30^{th}$-$40^{th}$ cycles compared to the other two materials. Less Jahn-Teller effect due to the presence of more $Mn^{4+}$ can increase the stability of the layer structure. It can be specifically noticed when the material after being pushed to very high currents can be somehow relaxed to C/10.

TABLE 3

Electrochemical capacity values of some examples in the $1^{st}$, $2^{nd}$, $25^{th}$ and $100^{th}$ cycle.

| Compound | C/10- $2^{nd}$ charge/disch | C/5- $6^{th}$ charge/disch | 1 C- $11^{th}$ charge/disch | 5 C- $16^{th}$ charge/disch |
|---|---|---|---|---|
| $Na_{2/3}Mn_{0.8}Zn_{0.1}Cu_{0.1}O_2$ | 121.63/117.87 | 122.92/108.74 | 108.17/75.35 | 63.20/31.36 |
| $Na_{2/3}Mn_{0.8}Zn_{0.1}Ti_{0.1}O_2$ | 152.24/147.68 | 146.17/125.62 | 123.91/75.49 | 31.54/27.02 |
| $Na_{2/3}Mn_{0.8}Fe_{0.1}Cu_{0.1}O_2$ | 142.59/141.67 | 141.27/120.38 | 117.00/74.11 | 73.78/41.76 |
| $Na_{2/3}Mn_{0.8}Fe_{0.1}Al_{0.1}O_2$ | 123.25/117.44 | 114.51/100.42 | 93.39/58.91 | 56.59/30.53 |

| Compound | 10 C- $21^{th}$ charge/disch | 50 C- $26^{th}$ charge/disch | C/10- $31^{h}$ charge/disch |
|---|---|---|---|
| $Na_{2/3}Mn_{0.8}Zn_{0.1}Cu_{0.1}O_2$ | 25.42/11.43 | 0.24/0.02 | 44.29/116.88 |
| $Na_{2/3}Mn_{0.8}Zn_{0.1}Ti_{0.1}O_2$ | 27.02/10.11 | 0.01/0.01 | 32.07/135.98 |
| $Na_{2/3}Mn_{0.8}Fe_{0.1}Cu_{0.1}O_2$ | 43.77/28.97 | 6.97/0.01 | 50.59/127.43 |
| $Na_{2/3}Mn_{0.8}Fe_{0.1}Al_{0.1}O_2$ | 32.65/22.02 | 12.14/2.36 | 35.19/107.19 |

One example that has to be mentioned is $Na_{2/3}Mn_{0.9}Fe_{0.05}Ti_{0.05}O_2$ where the effect of a small amount of substituents 0.05 Fe and 0.05 Ti per f.u. can be noticed in the stability of the material when it is charged and discharged at 1C and even at higher C-rates.

Figure 11A:
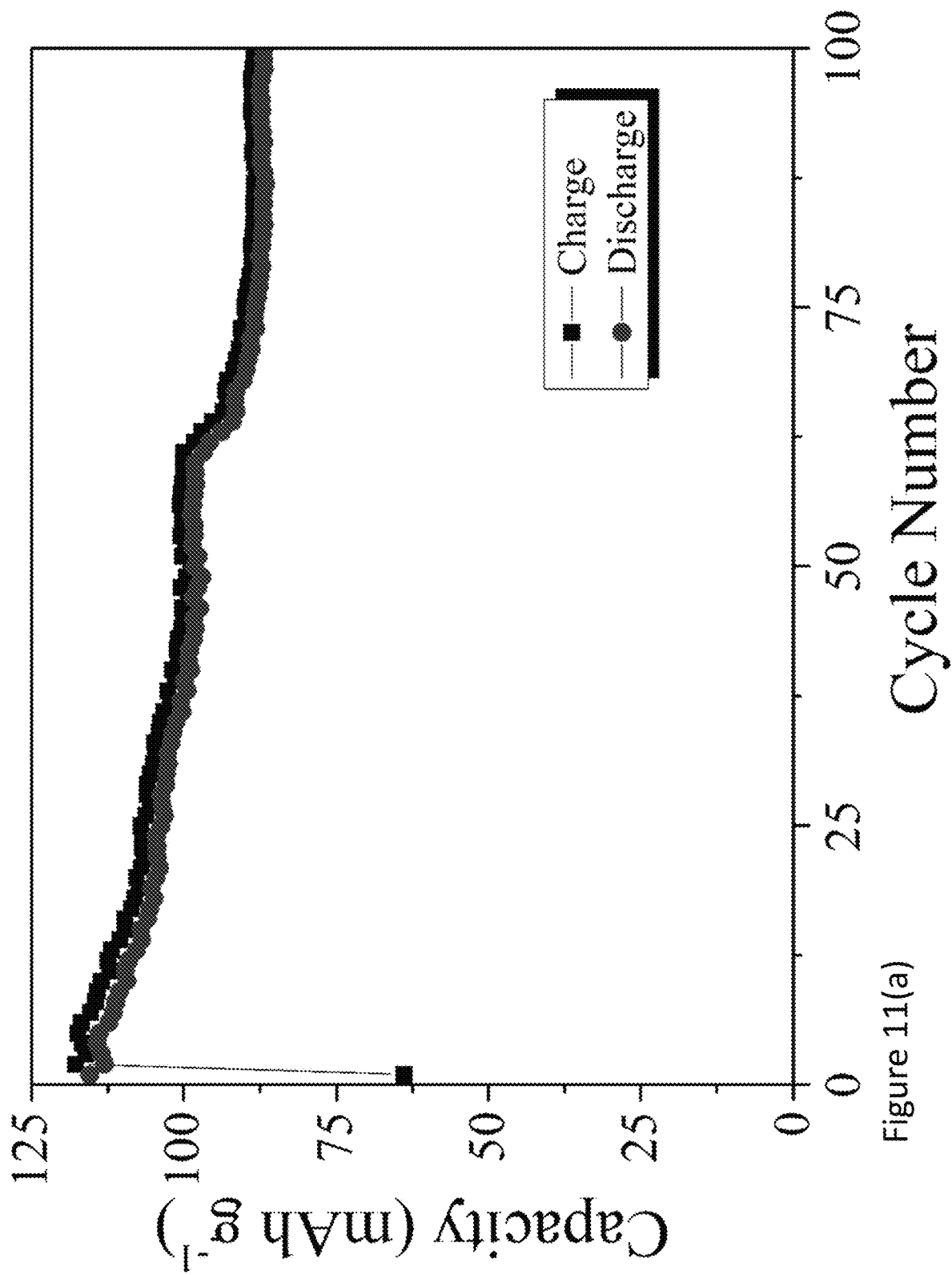
FIG. 11. Electrochemical performance of $Na_{2/3}Mn_{0.9}Fe_{0.05}Ti_{0.05}O_2$ (a) at 1C and (b) under a rate capability test.

FIG. 11(a) shows the extremely good capacity values of $Na_{2/3}Mn_{0.9}Fe_{0.05}Ti_{0.05}Ti_{0.05}O_2$ at a voltage range where $Ti^{4+}$ and $Fe^{4+}$ are electrochemically inactive. Capacity values of 63.86 mAh/g and 115.45 mAh/g in the $1^{st}$ charge discharge cycle have been found, and they seem to be constant in the $25^{th}$ cycle (107.03/103.77 mAh/g). After 100 cycles the 76.5% of the initial capacity is maintained.

Figure 11B:
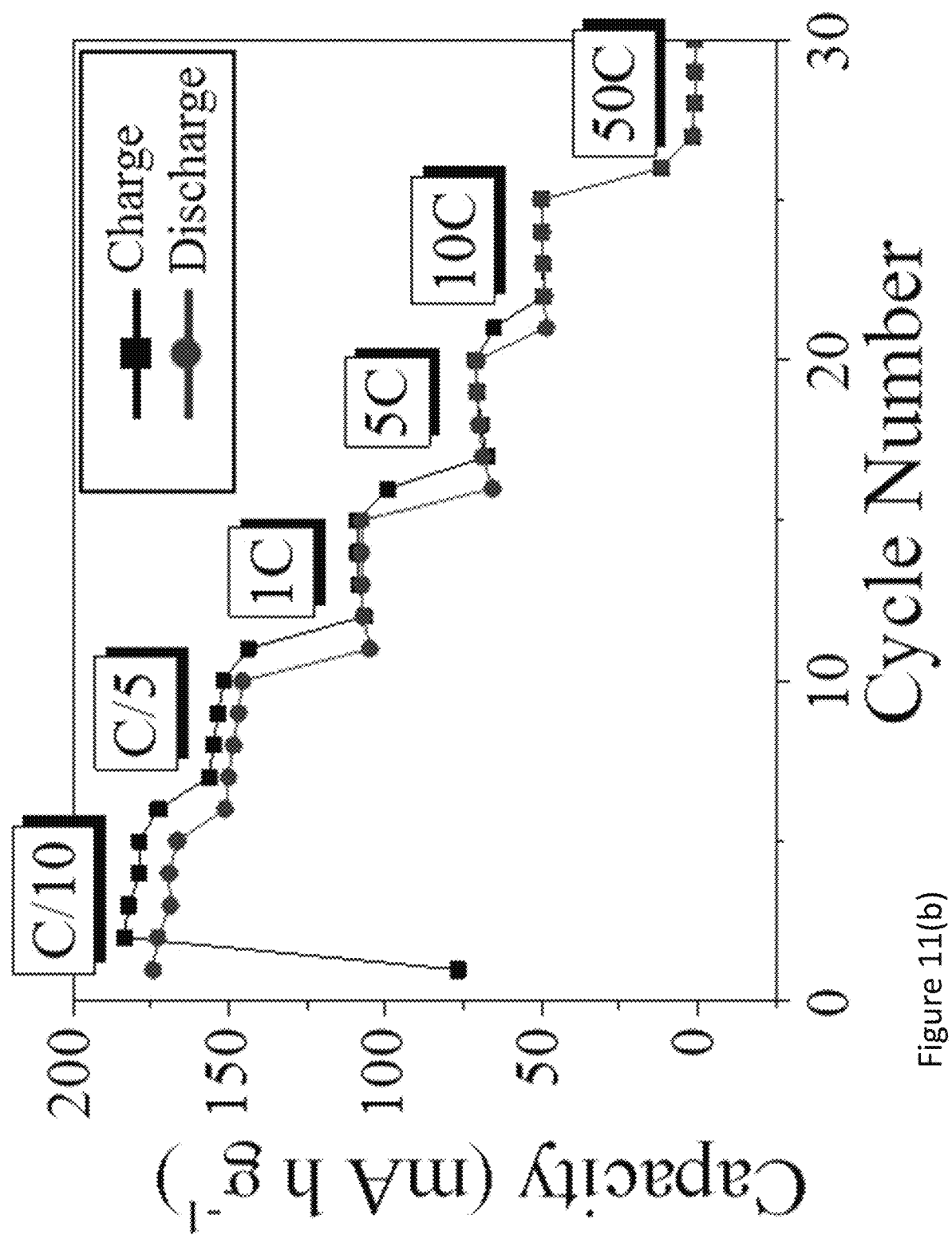

When a rate capability test was applied to the material (see FIG. 11(b)) the stability of the structure assisted by the Fe and Ti has been one more time proved.

What is claimed is:

1. A positive electrode active material for a sodium-ion secondary battery, said positive electrode active material comprising a compound of formula (I):

$$Na_xMn_{1-y-z}M_yM'_zO_2 \quad (I)$$

or a hydrated form thereof, wherein:

M is one or more elements selected from Ti, V, Cr, Zr, and Al; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$; and Al is $Al^{3+}$;

M' is one or more elements selected from Fe, Ni and Zn; wherein Fe is selected from $Fe^{2+}$ and $Fe^{3+}$; Ni is $Ni^{3+}$; and Zn is $Zn^{2+}$;

the oxidation state of Mn ranges from $3^+$ to $4^+$;

$0.6 < x \leq 1.0$;

$0 < y \leq 0.4$;

$0.05 \leq z < 0.2$;

provided that:

$0.05 < (y+z) \leq 0.4$;

and wherein the compound of formula (I) is single phase and has a pristine P2-layered structure.

2. The positive electrode active material according to claim 1, wherein the index "y" is defined as $0.05 \leq y \leq 0.2$.

3. The positive electrode active material according to claim 1, wherein the index "y" is defined as $0.05 \leq y \leq 0.1$.

4. The positive electrode active material according to claim 1, wherein the index "z" is defined as $0.05 \leq z \leq 0.1$.

5. The positive electrode active material according to claim 1, wherein the sum of indexes (y+z) is defined as $0.1 \leq (y+z) \leq 0.2$.

6. The positive electrode active material according to claim 1, wherein the index "y" is 0.1.

7. The positive electrode active material according to claim 1, wherein the index "z" is 0.1.

8. The positive electrode active material according to claim 1, wherein M is selected from Ti, and Al, wherein Ti is selected from $Ti^{3+}$ and $Ti^{4+}$, and Al is $Al^{3+}$.

9. The positive electrode active material according to claim 1, wherein M' is selected from Fe and Zn, wherein Fe is selected from $Fe^{2+}$ and $Fe^{3+}$ and Zn is $Zn^{2+}$.

10. The positive electrode active material according to claim 1, wherein the compound of formula (I) is selected from $Na_{2/3}Mn_{0.8}Ti_{0.1}Fe_{0.1}O_2$; $Na_{2/3}Mn_{0.8}Al_{0.1}Fe_{0.1}O_2$; $Na_{2/3}Mn_{0.8}Ti_{0.1}Zn_{0.1}O_2$; $Na_{2/3}Mn_{0.8}Al_{0.1}Zn_{0.1}O_2$ and $Na_{2/3}Mn_{0.9}Ti_{0.05}Fe_{0.05}O_2$.

11. A cathode for a rechargeable sodium-ion secondary battery, said cathode comprising a positive electrode active material, wherein the positive electrode active material comprises a compound of formula (I):

$$Na_xMn_{1-y-z}M_yM'_zO_2 \quad (I)$$

or a hydrated form thereof,
wherein:
M is one or more elements selected from Ti, V, Cr, Zr, and Al; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$; and Al is $Al^{3+}$;
M' is one or more elements selected from Fe, Ni and Zn; wherein Fe is selected from $Fe^{2+}$ and $Fe^{3+}$; Ni is $Ni^{3+}$; and Zn is $Zn^{2+}$;
the oxidation state of Mn ranges from $3^+$ to $4^+$;
$0.6 < x \le 1.0$;
$0 < y \le 0.4$;
$0.05 \le z < 0.2$;
provided that:
$0.05 < (y+z) \le 0.4$;
and wherein the compound of formula (I) is single phase and has a pristine P2-layered strcture.

12. The cathode according to claim 11, which comprises a current collector made of an aluminum or copper foil covered by a film, said film comprising the positive electrode active material, a conductive additive and a binder, wherein the positive electrode active material comprises a compound of formula (I):

$$Na_xMn_{1-y-z}M_yM'_zO_2 \quad (I)$$

or a hydrated form thereof,
wherein:
M is one or more elements selected from Ti, V, Cr, Zr, and Al; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$; and Al is $Al^{3+}$;
M' is one or more elements selected from Fe, Ni and Zn; wherein Fe is selected from $Fe^{2+}$ and $Fe^{3+}$; Ni is $Ni^{3+}$; and Zn is $Zn^{2+}$;
the oxidation state of Mn ranges from $3^+$ to $4^+$;
$0.6 < x \le 1.0$;
$0 < y \le 0.4$;
$0.05 \le z < 0.2$;
provided that:
$0.05 < (y+z) \le 0.4$;
and wherein the compound of formula (I) is single phase and has a pristine P2-layered structure.

13. A rechargeable sodium-ion secondary battery comprising the cathode as defined in claim 11.

14. A method of storing energy, the method comprising:
providing an energy storage device, wherein:
the energy storage device comprising a rechargeable sodium-ion secondary battery comprising a cathode, said cathode comprising a current collector made of an aluminum or copper foil covered by a film, said film comprising the positive electrode active material, a conductive additive and a binder, wherein the positive electrode active material comprises a compound of formula (I):

$$Na_xMn_{1-y-z}M_yM'_zO_2 \quad (I)$$

or a hydrated form thereof,
wherein:
M is one or more elements selected from Ti, V, Cr, Zr, and Al; wherein Ti is selected from $Ti^{3+}$ and $Ti^{4+}$; V is selected from $V^{2+}$, $V^{3+}$, $V^{4+}$, $V^{5+}$; Cr is selected from $Cr^{2+}$, $Cr^{3+}$ and $Cr^{6+}$; Zr is $Zr^{4+}$; and Al is $Al^{3+}$;
M' is one or more elements selected from Fe, Ni and Zn; wherein Fe is selected from $Fe^{2+}$ and $Fe^{3+}$; Ni is $Ni^{3+}$; and Zn is $Zn_{2+}$;
the oxidation state of Mn ranges from $3^+$ to $4^+$;
$0.6 < x \le 1.0$;
$0 < y \le 0.4$;
$0.05 \le z < 0.2$;
provided that:
$0.05 < (y+z) \le 0.4$;
and wherein the compound of formula (I) is single phase and has a pristine P2-layered; and
storing in the energy storage device.

* * * * *